US010940881B2

(12) United States Patent
Kurokawa et al.

(10) Patent No.: US 10,940,881 B2
(45) Date of Patent: Mar. 9, 2021

(54) STEERING DEVICE

(71) Applicant: NSK LTD., Tokyo (JP)

(72) Inventors: Yoshifumi Kurokawa, Maebashi (JP);
Nobuyuki Nishimura, Maebashi (JP)

(73) Assignee: NSK LTD., Tokyo (JP)

( * ) Notice: Subject to any disclaimer, the term of this patent is extended or adjusted under 35 U.S.C. 154(b) by 99 days.

(21) Appl. No.: 16/318,574

(22) PCT Filed: Jul. 18, 2017

(86) PCT No.: PCT/JP2017/025979
§ 371 (c)(1),
(2) Date: Jan. 17, 2019

(87) PCT Pub. No.: WO2018/016491
PCT Pub. Date: Jan. 25, 2018

(65) Prior Publication Data
US 2019/0300041 A1 Oct. 3, 2019

(30) Foreign Application Priority Data

Jul. 19, 2016 (JP) .............................. JP2016-141068
Jun. 1, 2017 (JP) .............................. JP2017-109203

(51) Int. Cl.
B62D 1/184 (2006.01)
B62D 1/189 (2006.01)

(52) U.S. Cl.
CPC ............. B62D 1/184 (2013.01); B62D 1/189 (2013.01)

(58) Field of Classification Search
CPC ........ B62D 1/184; B62D 1/187; B62D 1/189; B62D 1/18

(Continued)

(56) References Cited

U.S. PATENT DOCUMENTS 6,062,101 A * 5/2000 Higashino .............. B62D 1/184
74/493
2002/0089161 A1* 7/2002 Yamamura ............. B62D 1/184
280/777

(Continued)

FOREIGN PATENT DOCUMENTS

DE 10 2015 000 028 A1 7/2016
DE 102015000027 A1 * 7/2016 ............. B62D 1/192

(Continued)

OTHER PUBLICATIONS

Machine Translation of DE-102015000027-A1 (Year: 2015).*

(Continued)

Primary Examiner — James A English
Assistant Examiner — Kurtis Nielson
(74) Attorney, Agent, or Firm — Sughrue Mion, PLLC

(57) ABSTRACT

Reinforcing ribs (33a and 33b) are provided between mounting plate parts (30a and 30b) and support plate parts (31a and 31b) forming a support bracket (18a). Side plate parts (40a and 40b) forming a distance bracket (17a) are disposed between the support plate parts (31a and 31b), and an outer column (13a). When an adjustment lever (26a) is operated to hold a steering wheel at a position after adjustment, a steering column (6a) is pushed toward an upper side by column pressing parts (42a and 42b) provided at the side plate parts (40a and 40b), and, therefore, a pair of widened parts (43a and 43b) provided at upper parts of the side plate parts (40a and 40b) are pushed and expanded to the outside in a width direction. The widened parts (43a and 43b) are sandwiched between the support plate parts (31a and 31b) and the outer column (13a).

7 Claims, 15 Drawing Sheets

(58) Field of Classification Search
USPC .......................................................... 280/779
See application file for complete search history.

(56) References Cited

U.S. PATENT DOCUMENTS

| | | | |
|---|---|---|---|
| 2005/0050978 A1 | 3/2005 | Lee | |
| 2006/0028010 A1* | 2/2006 | Yamada | B62D 1/184 280/775 |
| 2008/0252056 A1* | 10/2008 | Moriyama | B62D 1/184 280/775 |
| 2009/0107283 A1 | 4/2009 | Uesaka | |
| 2012/0318092 A1 | 12/2012 | Kuroumaru | |
| 2013/0213174 A1* | 8/2013 | Suzuki | B62D 1/187 74/493 |
| 2014/0076091 A1* | 3/2014 | Yokota | B62D 1/18 74/493 |
| 2015/0069745 A1 | 3/2015 | Iwakawa et al. | |
| 2015/0075316 A1 | 3/2015 | Iwakawa et al. | |
| 2015/0090067 A1 | 4/2015 | Iwakawa et al. | |
| 2015/0122075 A1 | 5/2015 | Mihara et al. | |
| 2016/0288818 A1* | 10/2016 | Matsuno | B62D 1/184 |
| 2016/0288819 A1* | 10/2016 | Uesaka | B62D 1/16 |
| 2017/0361862 A1* | 12/2017 | Charvet | B62D 1/184 |
| 2018/0009463 A1* | 1/2018 | Yoshihara | B62D 1/185 |
| 2018/0265115 A1* | 9/2018 | Gstohl | B62D 1/185 |
| 2018/0362069 A1* | 12/2018 | Sugiura | B62D 1/189 |
| 2019/0031225 A1* | 1/2019 | Kurokawa | B62D 1/184 |
| 2019/0300041 A1* | 10/2019 | Kurokawa | B62D 1/184 |

FOREIGN PATENT DOCUMENTS

| | | |
|---|---|---|
| EP | 2727795 A1 | 5/2014 |
| EP | 3395647 A1 | 10/2018 |
| JP | 2002-87285 A | 3/2002 |
| JP | 2010-30579 A | 2/2010 |
| JP | 2011-148487 A | 8/2011 |
| JP | 2012-232728 A | 11/2012 |
| JP | 2013-1242 A | 1/2013 |
| JP | 2014-104786 A | 6/2014 |
| JP | 2014-237397 A | 12/2014 |
| JP | 2016-84137 A | 5/2016 |
| WO | 2013/176191 A1 | 11/2013 |
| WO | 2014/125998 A1 | 8/2014 |

OTHER PUBLICATIONS

Communication dated Jun. 27, 2019, issued by the European Patent Office in counterpart European Application No. 17831007.4.
International Search Report (PCT/ISA/210) dated Oct. 10, 2017 issued by the International Searching Authority in International Application No. PCT/JP2017/025979.
Written Opinion (PCT/ISA/237) dated Oct. 10, 2017 issued by the International Searching Authority in International Application No. PCT/JP2017/025979.

* cited by examiner

STEERING DEVICE

TECHNICAL FIELD

The present invention relates to improvement of a steering device for imparting a steering angle to a steering wheel of a vehicle such as an automobile, and the like.

BACKGROUND ART

A steering device for an automobile has been known, for example, as described in Patent Document 1, and the like. As illustrated in FIG. 13, the steering device transmits rotation of a steering wheel 1 to an input shaft 3 of a steering gear unit 2, and pushes and pulls a pair of right and left tie rods 4 and 4 in accordance with the rotation of the input shaft 3, thereby imparting a steering angle to a wheel (a front wheel).

The steering wheel 1 is supported and fixed to a rear end part of a steering shaft 5, and the steering shaft 5 is rotatably supported by a steering column 6 in a state where the cylindrical steering column 6 is inserted in an axial direction. Further, a front end part of the steering shaft 5 is connected to a rear end part of an intermediate shaft 8 through a universal joint 7, and a front end part of the intermediate shaft 8 is connected to the input shaft 3 through another universal joint 9. Additionally, in an example illustrated in the drawings, an electric power assist device for reducing a force required for operating the steering wheel 1 by using an electric motor 10 as an auxiliary power source is also incorporated.

Further, in this specification and the scope of the patent claims, a front-and-rear direction, a width direction (a left-and-right direction) and an up-and-down direction indicate a front-and-rear direction of a vehicle, a width direction (a left-and-right direction) thereof, and an up-and-down direction thereof, unless otherwise stated.

The steering device illustrated in the drawing is provided with a tilt mechanism for adjusting a vertical position of the steering wheel 1, and a telescopic mechanism for adjusting a longitudinal position depending on a physique and a driving posture of a driver. In order to form the tilt mechanism, the steering column 6 is supported so that the steering column 6 can swing around a pivot 12 installed in a width direction with respect to a vehicle body 11. Further, in order to form the telescopic mechanism, the steering column 6 has a structure in which an outer column 13 on a rear side and an inner column 14 on a front side are telescopically combined with each other to be expandable and contractible. Additionally, the steering shaft 5 has a structure in which an outer shaft 15 on a rear side and an inner shaft 16 on a front side are combined with each other to be able to transmit torque and to be expandable and contractible by spline engagement, and the like. Further, a distance bracket 17 fixed to a portion near a rear end of the outer column 13 is supported to be displaced in the up-and-down direction and the front-and-rear direction with respect to a support bracket 18 supported and fixed to the vehicle body 11.

In the case of the steering device capable of performing position adjustment of the steering wheel as described above, in a related art, it has been considered that a state in which the position of the steering wheel can be adjusted and a state in which a position after adjustment can be held are switched by using a clamp mechanism. A detailed structure of such a clamp mechanism will be described with reference to FIG. 14 described in Patent Document 2.

In the case of a structure illustrated in the drawings, a slit 19 is formed on a lower surface of the outer column 13, and the distance bracket 17 is provided at a portion where the slit 19 is sandwiched from opposite sides in a width direction. Further, a pair of long holes for telescopic adjustment 21 and 21, which are long in the front-and-rear direction, are formed at a pair of side plate parts 20a and 20b forming the distance bracket 17. On the other hand, in the support bracket 18 supported and fixed to a vehicle body, long holes for tilt adjustment 23 and 23, which are long in the up-and-down direction, are formed at a pair of support plate parts 22a and 22b disposed on opposite sides in the width direction of the opposite side plate parts 20a and 20b. An adjustment rod 24 is inserted into the long holes for tilt adjustment 23 and 23 and the long holes for telescopic adjustment 21 and 21 in the width direction.

Further, a nut 25 is screwed into a portion protruding from an outer side surface in a width direction of a support plate part 22a on one side (a right side in FIG. 14) at a tip part of the adjustment rod 24. On the other hand, an adjustment lever 26 is fixed to a portion protruding from an outer side surface in a width direction of a support plate part 22b on the other side (a left side in FIG. 14) at a base end part of the adjustment rod 24. Further, a cam device 27 is provided between the adjustment lever 26 and the outer side surface in the width direction of the support plate part 22b on the other side. Then, based upon operation of the adjustment lever 26, a width direction dimension of the cam device 27 can be expanded and contracted.

Further, an eccentric cam 28 is externally fitted and fixed around an intermediate part of the adjustment rod 24 so as not to be relatively rotatable. The eccentric cam 28 is caused to enter the inside of the outer column 13 through the slit 19.

When adjusting the vertical position or the longitudinal position of the steering wheel 1 (refer to FIG. 13), the width direction dimension of the cam device 27 is reduced by swinging the adjustment lever 26 in a predetermined direction. As a result, a frictional force acting between inner side surfaces in the width direction of the opposite support plate parts 22a and 22b and outer side surfaces in the width direction of the opposite side plate parts 20a and 20b is reduced. At the same time, a gap is interposed between an outer peripheral surface of the eccentric cam 28 and an outer peripheral surface of the inner column 14. As a result, the position of the steering wheel 1 can be adjusted within a range where the adjustment rod 24 can be displaced within the long holes for tilt adjustment 23 and 23 and the long holes for telescopic adjustment 21 and 21.

On the other hand, after performing the position adjustment of the steering wheel 1, the width direction dimension of the cam device 27 is enlarged by swinging the adjustment lever 26 in a direction opposite to the predetermined direction. Accordingly, the frictional force acting between the inner side surfaces in the width direction of the support plate parts 22a and 22b and the outer side surfaces in the width direction of the side plate parts 20a and 20b is increased. At the same time, the outer peripheral surface of the eccentric cam 28 is pressed against the outer peripheral surface of the inner column 14, and the outer peripheral surface of the inner column 14 is frictionally engaged with the inner peripheral surface of the outer column 13. As a result, the steering wheel 1 is held at the position after the adjustment.

In the case of the steering device having the structure of the related art as described above, since the number of frictional engagement parts contributing to holding the position of the steering wheel 1 can be increased by the amount of the existence of the eccentric cam 28, it is advantageous for increasing the force for holding the steering wheel 1 at the position after the adjustment.

However, in the case of the structure of the related art, it is difficult to achieve both improvement of a holding force of the distance bracket 17 by the support bracket 18 and improvement of support rigidity of the steering column 6 in the width direction. For example, in order to improve the holding force by the support bracket 18, it can be considered to lower the rigidity of both the support plate parts 22a and 22b in the width direction. However, in this case, although the holding force can be increased, the support rigidity is lowered. On the contrary, in order to increase the support rigidity of the steering column 6 in the width direction, it can be considered to increase the rigidity of both the support plate parts 22a and 22b in the width direction. However, in this case, although the support rigidity can be increased, the holding force is lowered. As described above, in the case of the structure of the related art, it is difficult to achieve both improvement of the holding force by the support bracket 18 and improvement of the support rigidity of the steering column 6 in the width direction.

RELATED ART REFERENCE

Patent Document

[Patent Document 1]: JP-A-2014-104786
[Patent Document 2]: JP-A-2010-30579

SUMMARY OF THE INVENTION

Problems to be Solved by the Invention

In consideration of the above-mentioned circumstances, the present invention is to realize a structure capable of accomplishing both improvement of a holding force of a distance bracket by a support bracket and improvement of support rigidity of a steering column in a width direction.

Means for Solving the Problems

A steering device of the present invention is provided with a steering column, a support bracket, a distance bracket, and an adjustment rod.

The steering column is formed in, for example, a hollow cylindrical shape such as a cylindrical shape, an angular cylindrical shape, or the like, and rotatably supports a steering shaft at the inside.

The support bracket includes a pair of mounting plate parts which are supported and fixed to a vehicle body, and a pair of support plate parts respectively hanging downward (for example, bent approximately at a right angle) from inner end parts in a width direction of the pair of mounting plate parts.

The distance bracket includes a pair of side plate parts which are disposed between inner side surfaces in the width direction of the pair of support plate parts and an outer peripheral surface of the steering column.

The adjustment rod is provided in a state of respectively inserting into a first through hole provided in at least one of the pair of support plate parts, and a pair of second through holes provided at the pair of side plate parts in the width direction.

Particularly, in the case of the steering device of the present invention, a column pressing part which presses the steering column in a direction of separating from the adjustment rod in an up-and-down direction is provided.

Further, the pair of side plate parts are provided with a pair of widened parts which are disposed on the side opposite to the adjustment rod (a column pressing part) with a center axis of the steering column sandwiched therebetween in the up-and-down direction, and have a gap between inner side surfaces thereof in the width direction becoming smaller linearly and curvedly as separating from the adjustment rod, thereby being pushed and expanded to the outside in the width direction by the steering column which is displaced in a direction of separating from the adjustment rod.

Further, a reinforcing rib is provided, for example, to be bridged, between (a bent part, a corner part) at least one mounting plate part of the pair of mounting plate parts and the support plate part hanging downward from the inner end part in the width direction of the mounting plate part.

In other words, the reinforcing rib is provided on at least one of a bent part between the mounting plate part and the support plate part disposed on one side in the width direction and a bent part between the mounting plate part and the support plate part disposed on the other side in the width direction.

When implementing the steering device of the present invention described above, the support bracket can be manufactured by performing extrusion molding, pultrusion molding, or die-cast molding on a material (substance) of a light alloy such as, for example, an aluminum-based alloy, and the like, and alternatively, can be manufactured by performing a punching process, a bending process, and the like by a press process on a metal plate such as a stainless steel plate, and the like.

Further, the reinforcing rib can be integrally formed with the support bracket, and alternatively, can be fixed by welding, and the like as a separate body. For example, when the support bracket is manufactured by the extrusion molding, the pultrusion molding and the die-casting molding, the reinforcing rib can be integrally formed with the support bracket. On the other hand, when the support bracket is manufactured by performing the press process, and the like on the metal plate, the reinforcing rib can be fixed to the support bracket as a separate body.

Further, when implementing the steering device of the present invention, a formation range of the reinforcing rib is not particularly limited. For example, the reinforcing rib can be formed at a right upper part of the first through hole provided at the support plate part (a range aligned with the first through hole and the front-and-rear direction) in the bent part between the mounting plate part and the support plate part. Further, the reinforcing rib can be provided continuously or intermittently over the whole length in the front-and-rear direction of the bent part, or can be provided at a part in the front-and-rear direction of the bent part.

Further, when implementing the steering device of the present invention, a shape of the reinforcing rib is not particularly limited. For example, a flat plate shape, a triangular prism shape (for example, a right-angled triangular prism shape), a columnar shape (for example, a quarter circular column shape), a prismatic shape, and the like can be adopted.

Further, when implementing the steering device of the present invention, the column pressing part can be respectively provided at the pair of side plate parts forming the distance bracket.

Specifically, in the pair of the side plate parts, the column pressing parts can be provided in a state of respectively protruding toward a direction of approaching each other (an inner side in the width direction) at a portion positioned between the center axis of the steering column and the respective second through holes in the up-and-down direction (for example, a portion adjacent to the steering column side in the up-and-down direction with respect to a portion where the second through holes are formed).

Further, in this case, the inner side surfaces in the width direction of the respective column pressing parts are inclined in a direction toward the outside in the width direction as separating from the adjustment rod in the up-and-down direction, such that a gap between the inner side surfaces in the width direction of the pair of column pressing parts becomes larger as separating from the adjustment rod in the up-and-down direction.

Alternatively, when implementing the steering device of the present invention, the column pressing part can be provided around the adjustment rod.

Specifically, the column pressing part is formed by an eccentric cam in which the distance from the center to an outer peripheral surface varies depending on a position in a circumferential direction, and the eccentric cam can be externally fitted and fixed to the periphery of the adjustment rod so as not to be relatively rotatable.

Further, when implementing the steering device of the present invention, for example, the pair of widened parts and the reinforcing rib can be provided at positions aligned with each other in the up-and-down direction (overlapped in the width direction).

Further, when implementing the steering device of the present invention, for example, the reinforcing rib can be formed in a hollow structure which is opened on opposite sides in a front-and-rear direction.

Further, the reinforcing rib can be formed in a solid structure.

Further, the reinforcing rib can be provided with a thickness reduced part which is opened only on an upper side (or, only a lower side).

Further, when implementing the steering device of the present invention, for example, the reinforcing rib can be formed over the axial direction at least at the right upper part of the second through hole when viewed in the front-and-rear direction.

Further, when implementing the steering device of the present invention, for example, the support plate part on one side hangs downward lower than the support plate part on the other side, and the first through hole can be provided only at the support plate part on one side. In this case, a lower end part of the support plate part on the other side can be positioned above the adjustment rod.

Further, when implementing the steering device of the present invention, for example, the column pressing part is provided below the center axis of the steering column in the up-and-down direction, and the pair of widened parts can be provided above the center axis of the steering column in the up-and-down direction.

Further, when implementing the steering device of the present invention, for example, inner side surfaces in the width direction of the pair of widened parts contact an outer peripheral surface of the steering column; and outer side surfaces in the width direction of the pair of widened parts contact the support plate part in a region where the pair of the widened parts contact the outer peripheral surface of the steering column in the up-and-down direction, and the pair of widened part can be solidly formed.

Further, when implementing the steering device of the present invention, for example, the steering column can be formed in a polygonal cylindrical shape so that the outer peripheral surface of the steering column comes into surface contact with at least one of the pair of column pressing parts and the pair of widened parts.

Further, when implementing the steering device of the present invention, for example, the distance bracket further includes a connection part for connecting the pair of side plate parts, and the pair of side plate parts and the connection part can be integrally formed.

Advantages of the Invention

According to a steering device of the present invention having the above-mentioned configuration, the present invention is made to achieve both improvement of a holding force of a distance bracket by a support bracket and improvement of support rigidity of a steering column in a width direction.

That is, in the case of the present invention, when the steering wheel is held at a position after adjustment, the steering column is pressed by the column pressing part in a direction of separating from the adjustment rod in the up-and-down direction, and is displaced in the direction. Then, the pair of widened parts provided at the pair of side plate parts forming the distance bracket are pushed and expanded to the outside in the width direction by the steering column. Accordingly, the pair of widened parts are sandwiched between the inner side surfaces in the width direction of the pair of support plate parts forming the support bracket and the outer peripheral surface of the steering column. Here, since a gap between the inner side surfaces in the width direction of the pair of widened parts becomes smaller as moving toward a displacement direction of the steering column (the direction of separating from the adjustment rod), the pair of widened parts can be firmly sandwiched between the inner side surfaces in the width direction of the pair of support plate parts and the outer peripheral surface of the steering column by wedge effect. Therefore, according to the present invention, the holding force of the distance bracket by the support bracket may be improved.

Further, in the case of the present invention, the reinforcing rib is provided between at least one mounting plate part of the pair of mounting plate parts forming the support bracket and the support plate part hanging downward from the inner end part in the width direction of the mounting plate part. Therefore, with respect to at least one of the support plate parts, the rigidity in the width direction can be improved. Therefore, according to the present invention, the improvement of the support rigidity in the width direction of the steering column can be achieved.

As described above, according to the present invention, it is possible not only to achieve improvement of a holding force of a distance bracket by a support bracket, but also to achieve improvement of support rigidity of a steering column in the width direction.

MODES FOR CARRYING OUT THE INVENTION

First Embodiment

Figure 13:
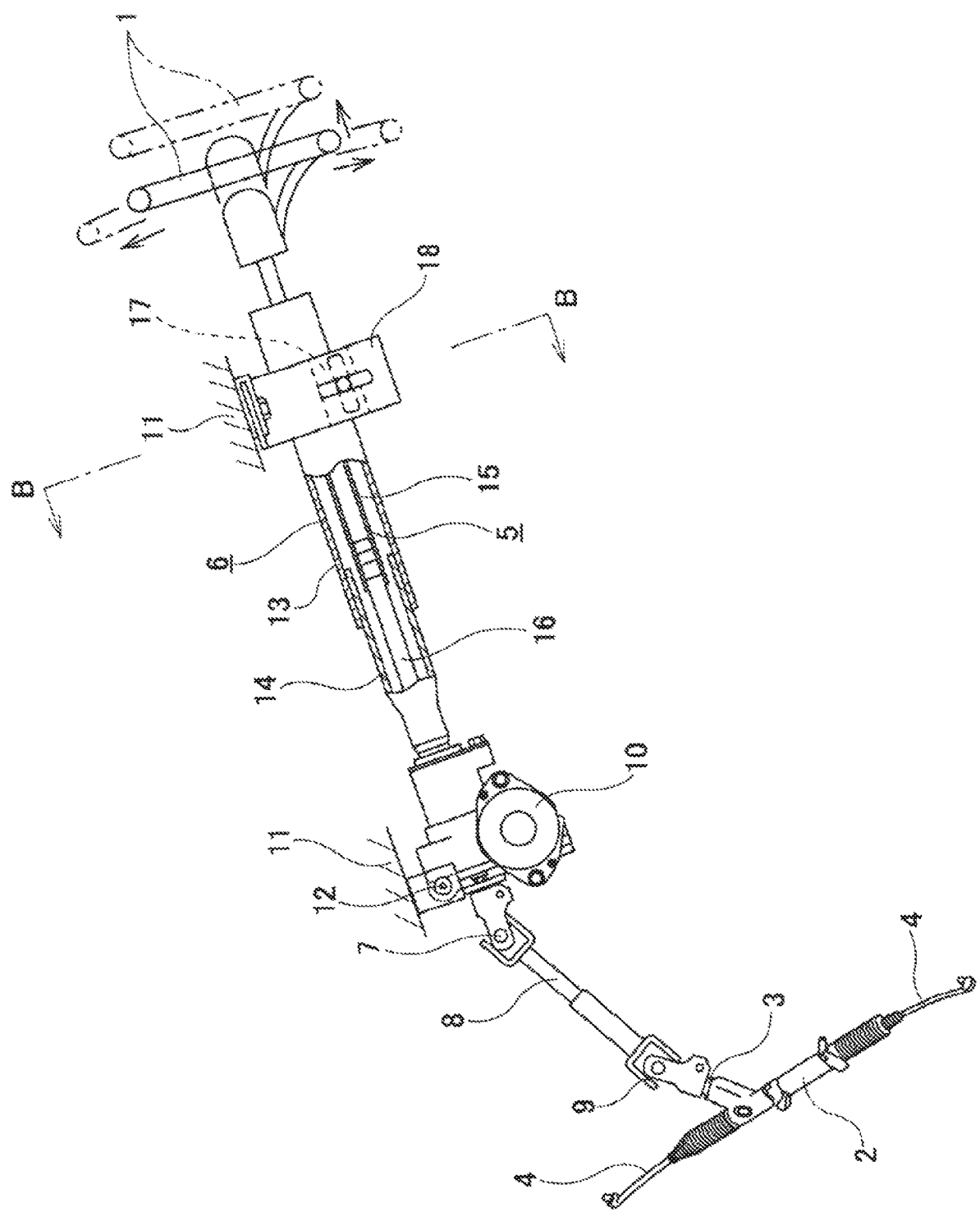
FIG. 13 is a partially cutting side diagram illustrating one example of a steering device which has been known as a related art.
Figure 14:
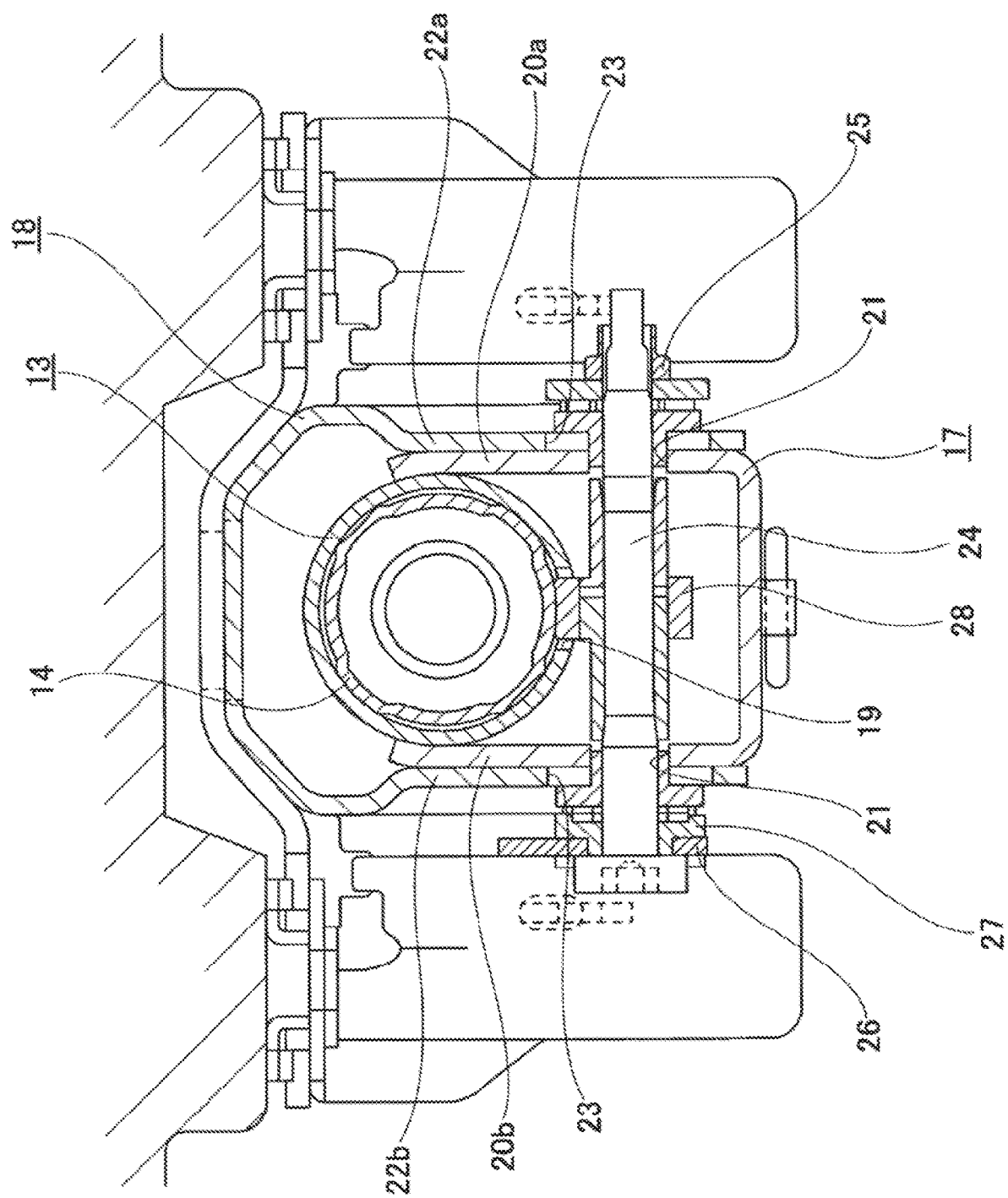
FIG. 14 illustrates a diagram corresponding to a cross section taken along the line B-B of FIG. 13 for describing a clamp mechanism having a structure of a related art.

A first embodiment of the present invention will be described with reference to FIGS. 1 to 4. A steering device for an automobile according to the present embodiment is capable of adjusting a longitudinal position of a steering wheel 1 (refer to FIG. 13) and a vertical position thereof, and is provided with a steering column 6a, a steering shaft 5a, a support bracket 18a, a distance bracket 17a, a clamp mechanism 29 configured to include an adjustment road 24a, and the like.

The steering column 6a is configured to be able to extend and contract a whole length in such a manner that a rear part of an inner column 14a disposed on a front side and a front part of an outer column 13a disposed on a rear side are fitted to each other to enable relative displacement in an axial direction. The inner column 14a is formed of an electric resistance welded pipe or a drawing pipe, and the like such as an iron-based alloy, or a light alloy such as an aluminum-based alloy and a magnesium-based alloy, and the like, and a whole inner column 14a is formed in simple cylindrical shape. A front end part of the inner column 14a is fixed to a rear end part of a housing (not illustrated) forming an electric power assist device. The housing is supported by a pivot 12 (refer to FIG. 13) installed in a width direction to enable only swing displacement in the up-and-down direction with respect to the vehicle body 11 (refer to FIG. 13). Therefore, the inner column 14a is supported in a state where the longitudinal position thereof is regulated with respect to the vehicle body 11.

The outer column 13a is integrally formed by die-cast molding of a light alloy such as an aluminum-based alloy and a magnesium-based alloy, and the whole outer column 13a is formed in a polygonal cylindrical shape (a dodecagonal cylindrical shape in an example). Further, slits 19a and 19a which are long in the axial direction are formed at two positions spaced apart from each other in a circumferential direction in a lower portion of a front end part of the outer column 13a. Accordingly, an inner diameter of the front end part of the outer column 13a can be elastically expanded and contracted. Further, a synthetic resin sleeve is sandwiched between an outer peripheral surface of the front end part of the outer column 13a and an outer peripheral surface of a rear end part of the inner column 14a, thereby making it possible to reduce sliding resistance between the outer column 13a and the inner column 14a to be small.

The steering shaft 5a spline-engages female spline teeth formed on an inner peripheral surface of an outer shaft 15a disposed on the rear side and male spline teeth formed on an outer peripheral surface of an inner shaft 16 (refer to FIG. 13) disposed on the front side, thereby enabling not only to expand and contract a whole length, but also to transmit torque. The steering shaft 5a having such a configuration is rotatably supported inside the steering column 6a. Specifically, a portion near an intermediate part rear end of the outer shaft 15a is supported to be only rotatable by a rolling bearing capable of supporting a radial load and an axial load such as a single row deep groove type ball bearing inside a rear end part of the outer column 13a. Therefore, the outer shaft 15a is moved in the axial direction in synchronization with the outer column 13a, and the steering shaft 5a is expanded and contracted according to the movement thereof. In such a steering shaft 5a, a rear end part thereof protrudes rearward from a rear end opening of the steering column 6a in a state where the steering shaft 5a is rotatably supported inside the steering column 6a. Then, the steering wheel 1 (refer to FIG. 13) can be supported at a portion protruding rearward.

The support bracket 18a is integrally formed by performing extrusion molding (or pultrusion molding) on a light alloy material such as an aluminum alloy, and the like, and is disposed around an intermediate part of the steering column 6a (a front end side portion of the outer column 13a). In the embodiment, the support bracket 18a is provided with a pair of mounting plate parts 30a and 30b for being supported and fixed to a vehicle body, a pair of support plate parts 31a and 31b for sandwiching the distance bracket 17a from opposite sides in the width direction, a bridge part 32, and a pair of reinforcing ribs 33a and 33b.

The mounting plate parts 30a and 30b are provided on opposite side portions in an upper width direction of the support bracket 18a, and the mounting plate parts 30a and 30b are formed in rectangular plate shapes respectively and are disposed in a horizontal direction. Further, in the case of the embodiment, notches 34 and 34 which are opened at respective rear end edges are formed at the mounting plate parts 30a and 30b in order to support and fix the support bracket 18a to be able to be displaced (separated) forward by an impact load based upon a secondary collision, with respect to the vehicle body 11. Capsules 35 and 35 fixed to the vehicle body 11 by bolts or studs not illustrated in the drawings are locked to the notches 34 and 34. The capsules 35 and 35 are formed by a material which is slippery with respect to the support bracket 18a (the mounting plate parts 30a and 30b) such as a synthetic resin, a soft metal such as an aluminum-based alloy, and the like. Further, the capsules 35 and 35 are respectively formed with locking grooves 36 and 36 for engaging opposite side portions in the width direction of the respective notches 34 and 34 on opposite side surfaces in the respective width directions; and through holes 37 and 37 for inserting the bolts or studs not illustrated in the drawings into a center part.

Support plate parts 31a and 31b are disposed in parallel with each other in a state of being spaced apart from each other in the width direction, and the support plate parts 31a and 31b are provided in a state of being bent at right angles respectively from inner end parts in the width direction of the mounting plate parts 30a and 30b, and of hanging downward. Further, long holes for tilt adjustment 23a and 23a corresponding to first through holes described in the scope of the patent claims are formed in a state of penetrating the support plate parts 31a and 31b in the width direction at positions where the support plate parts 31a and 31b are aligned with each other. The long holes for tilt adjustment 23a and 23a are partially circular arc shapes centering on the pivot 12.

The bridge part 32 is provided at the center part in the upper width direction of the support bracket 18a, has an approximately U-shape in cross section, and is continued with the inner end parts in the width direction of the mounting plate parts 30a and 30b in the width direction.

Figure 1:
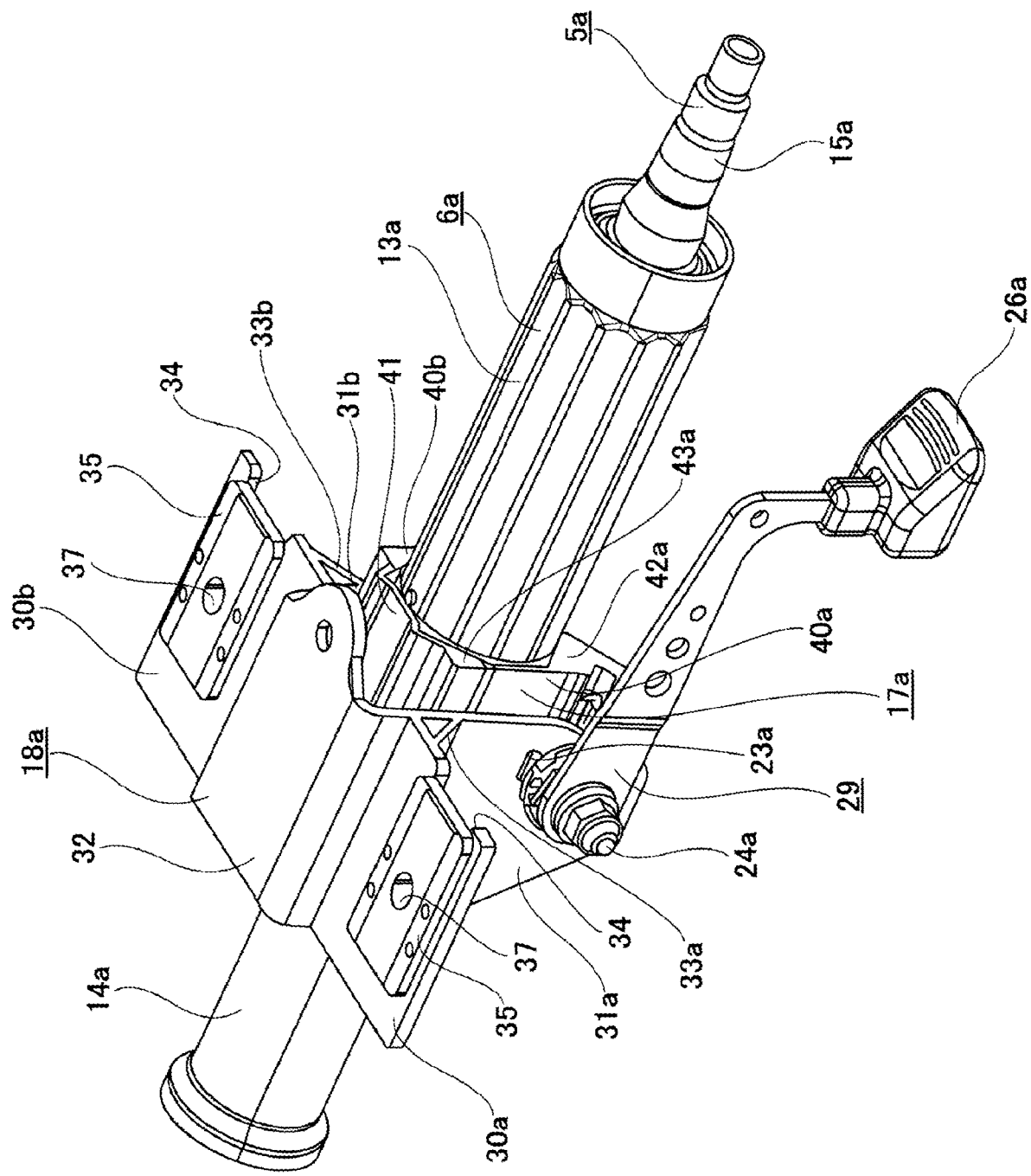
FIG. 1 is a perspective diagram illustrating a steering device according to a first embodiment of the present invention.
Figure 2:
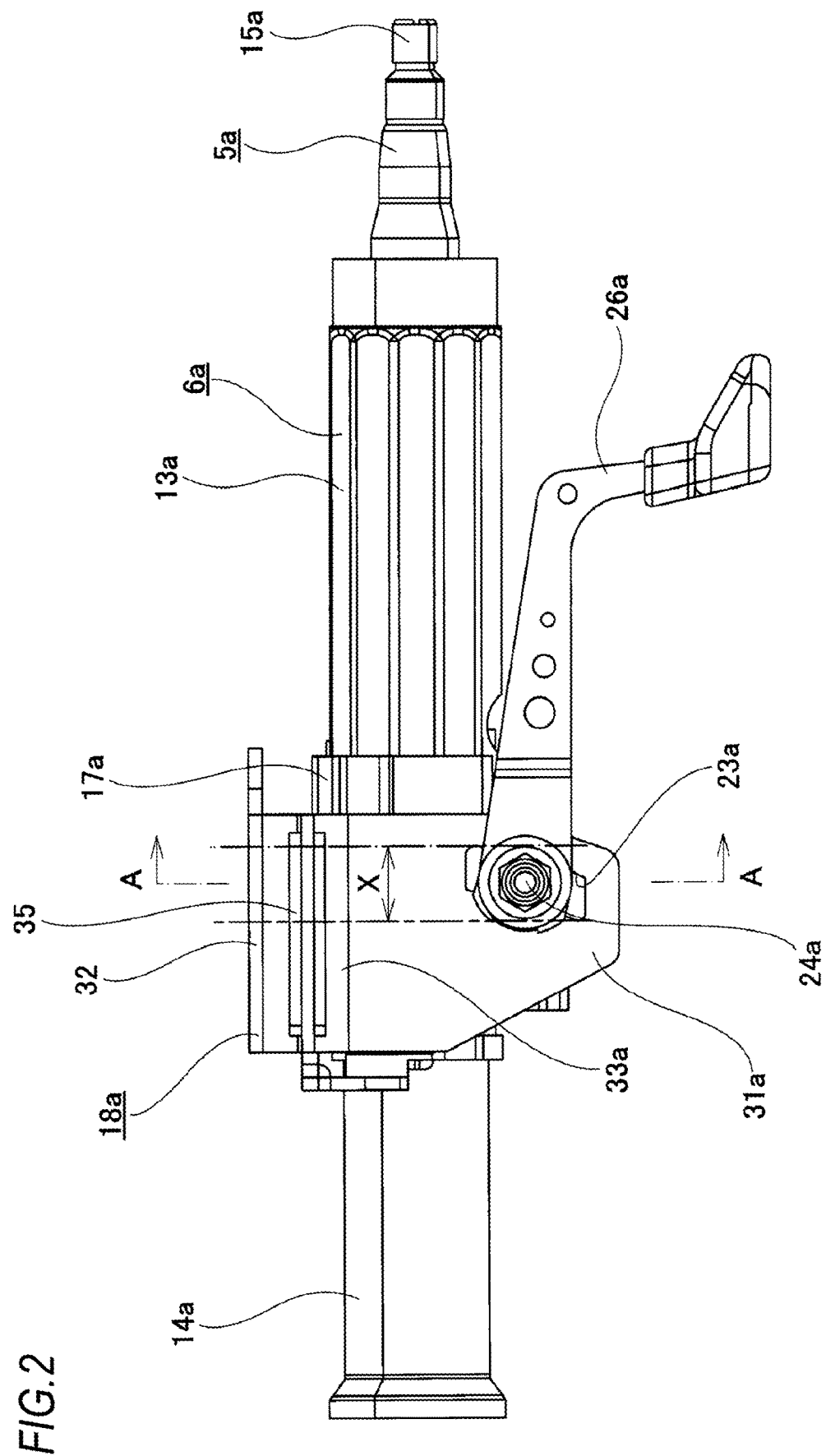
FIG. 2 illustrates a side diagram according to the first embodiment.
Figure 3:
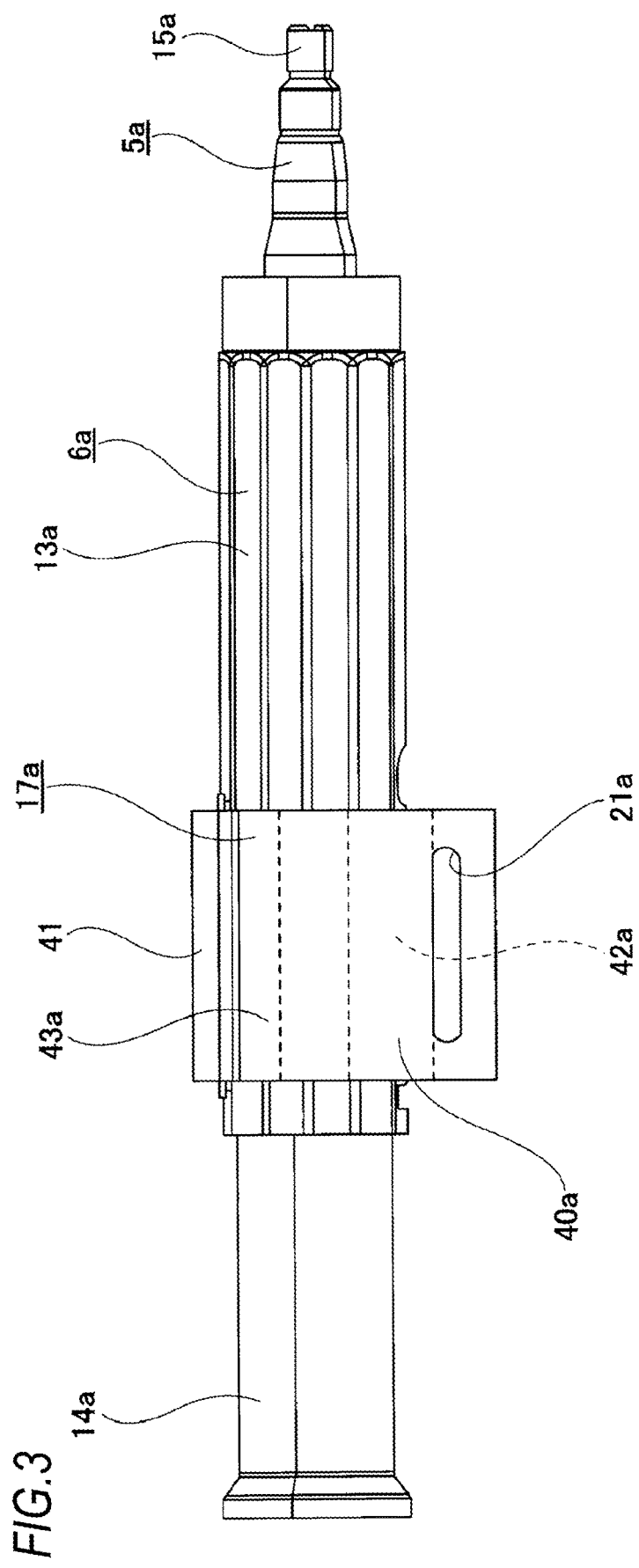
FIG. 3 illustrates a side diagram in which a support bracket and an adjustment rod are omitted in FIG. 2, according to the first embodiment.
Figure 4:
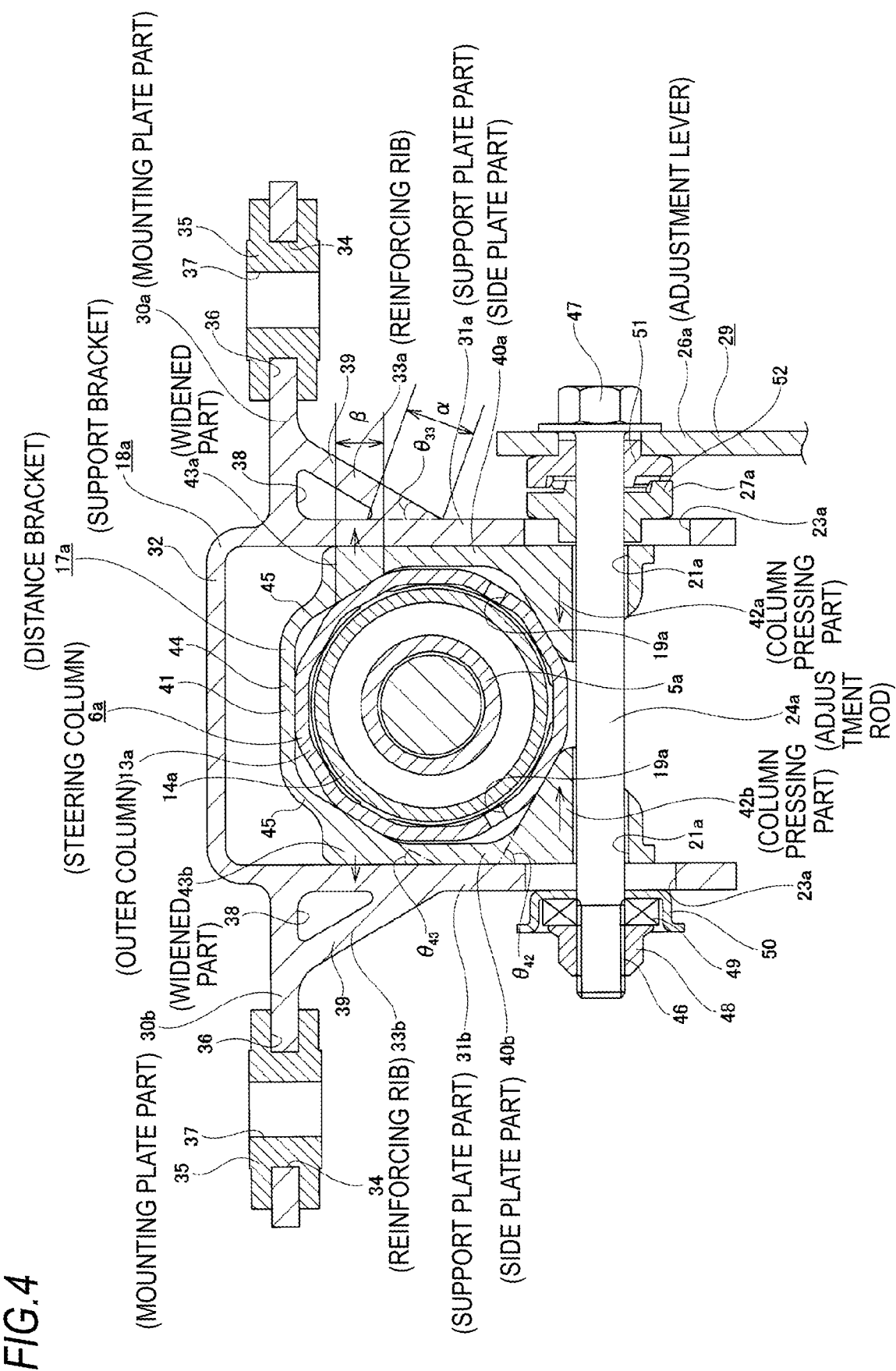
FIG. 4 illustrates a cross sectional diagram taken along the line A-A of FIG. 2 according to the first embodiment.

The reinforcing ribs 33a and 33b are continuously provided over the whole length in the front-and-rear direction of each corner part at two corner parts (bent parts) between lower surfaces of the mounting plate parts 30a and 30b and outer side surfaces in the width direction of the support plate parts 31a and 31b. That is, as illustrated in FIG. 2, lengths in the front-and-rear direction of the reinforcing ribs 33a and 33b are formed to be the same as lengths in the front-and-rear direction of the support plate parts 31a and 31b. However, each reinforcing rib 33a (33b) may be formed at a right upper part of each long hole for tilt adjustment 23a (in a range illustrated by X in FIG. 2). In other words, each reinforcing rib 33a (33b) may be formed over the axial direction at least at the right upper part of each long hole for tilt adjustment 23a when viewed in the front-and-rear direction. In the embodiment, the reinforcing ribs 33a and 33b are respectively formed to be in approximately right-angled triangular prism shapes in cooperation with the mounting plate parts 30a and 30b and the support plate parts 31a and 31b, and are provided with spaces 38 and 38 having approximately right-angled triangular shapes in cross section which are opened at opposite sides in the front-and-rear direction are respectively provided inside, thereby forming hollow structures as a whole. As a result, solid parts 39 and 39 (parts other than the spaces 38 and 38) of the reinforcing ribs 33a and 33b are respectively formed in flat plate shapes, are inclined in a direction toward the outside in the width direction as moving toward the upper side, and are provided to be bridged between the lower surfaces of portions near the inner ends in the width direction of the mounting plate parts 30a and 30b and the outer side surfaces in the width direction of portions near the upper ends of the support plate parts 31a and 31b. Preferably, the reinforcing ribs 33a and 33b are formed longer than lengths in a front-and-rear direction of side plate parts 40a and 40b of the distance bracket 17a which will be described later (that is, lengths in a front-and-rear direction of widened parts 43a and 43b).

Further, in the embodiment, thickness of the solid parts 39 and 39 of the reinforcing ribs 33a and 33b is set to be approximately the same as thickness of the mounting plate parts 30a and 30b and the support plate parts 31a and 31b. Additionally, inclination angles $\theta_{33}$ of the solid parts 39 and 39 of the reinforcing ribs 33a and 33b (inclination angles based upon a virtual plane orthogonal to a center axis of the adjustment rod 24a) are set to 30°. The inclination angle $\theta_{33}$ can be arbitrarily set. For example, with respect to all of the movement ranges in the up-and-down direction (a tilt direction) of the steering wheel 1, an up-and-down direction range α (refer to FIG. 4) of a connection part between the reinforcing ribs 33a and 33b and the support plate parts 31a and 31b can be determined, as will be described later, to be positioned within a range β (within a load generation range, refer to FIG. 4) where the widened parts 43a and 43b are pressed against the outside in the width direction based upon upward displacement of the outer column 13a, or to be positioned below the range β. Preferably, the inclination angle $\theta_{33}$ is determined from an aspect of improvement of rigidity as becoming larger, but can be determined in consideration of interference with other members (for example, the capsule 35 which will be described later, and the like).

In the support bracket 18a having the above-mentioned configuration, when a large impact load directed in the front is exerted based upon the secondary collision, and the like, the respective capsules 35 and 35 come out rearward from the respective notches 34 and 34, thereby being displaced (separated) forward. Accordingly, the steering wheel 1 is allowed to be displaced forward.

The distance bracket 17a is formed by a light alloy such as an aluminum alloy, and the like, is disposed around the front end side portion of the outer column 13a, and is provided with the pair of side plate parts 40a and 40b and a connection part 41. The pair of side plate parts 40a and 40b and the connection part 41 are formed as a single component integrally formed with the same material. That is, the distance bracket 17a provided with the pair of side plate parts 40a and 40b and the connection part 41 is integrally formed by die casting or extrusion molding, thereby improving dimensional accuracy and a holding force thereof.

The side plate parts 40a and 40b are positioned on opposite sides in the width direction of the distance bracket 17a and are respectively disposed (sandwiched) between inner side surfaces in the width direction of the pair of support plate parts 31a and 31b forming the support bracket 18a, and an outer peripheral surface of the outer column 13a. Further, the side plate parts 40a and 40b include long holes for telescopic adjustment 21a and 21a, column pressing parts 42a and 42b, and the widened parts 43a and 43b in order from the bottom.

The long holes for telescopic adjustment 21a and 21a correspond to second through holes described in the scope of the patent claims, are formed in a state of being penetrated in the width direction at portions near lower ends of the respective side plate parts 40a and 40a, and are elongated in the axial direction (the front-and-rear direction) of the outer column 13a.

The respective column pressing parts 42a and 42b are provided in a state of protruding in a direction of approaching each other (an inner side in the width direction) from inner side surfaces in the width direction of portions adjacent to upper sides of the respective long holes for telescopic adjustment 21a and 21a in the side plate parts 40a and 40b. Therefore, lower surfaces of the respective column pressing parts 42a and 42b form a part of the respective long holes for telescopic adjustment 21a and 21b. Further, the column pressing parts 42a and 42b enter between the outer peripheral surface of the outer column 13a (opposite side portions in a lower surface width direction) and the adjustment rod 24a which will be described later, in the up-and-down direction. Additionally, the respective column pressing parts 42a and 42b are respectively formed in an approximately right-angled triangular shape in each cross section, and the inner side surfaces thereof (a pressing surface) in the width direction corresponding to oblique sides are inclined in a direction toward the inner side in the width direction as moving toward the lower side. Therefore, a gap between inner side surfaces in the width direction of the column pressing parts 42a and 42b becomes large as moving toward the upper side. In an example illustrated in the drawings, inclination angles $\theta_{42}$ (inclination angles based upon the virtual plane orthogonal to the center axis of the adjustment rod 24a) of the inner side surfaces in the width direction of each of the column pressing parts 42a and 42b are set to 60°. Further, the inclination angle $\theta_{42}$ can be arbitrarily set, and, for example, the inclination angle $\theta_{42}$ can be set within a range of $15° \leq \theta_{42} \leq 85°$.

The respective widened parts 43a and 43b are positioned on the side opposite to the adjustment rod 24a with the center axis of the steering column 6a interposed therebetween in the up-and-down direction, and are provided at upper end parts of the respective side plate parts 40a and 40b. Further, the respective inner side surfaces in the width direction of the respective widened parts 43a and 43b are inclined so that the width dimension (plate thickness) becomes larger as moving toward the upper side.

Specifically, outer side surfaces in the width direction of the respective widened parts 43a and 43b contact with the inner side surfaces in the width direction of the support plate parts 31a and 31b up to a position where the respective widened parts 43a and 43b contact with the outer peripheral surface of the outer column 13a or a position higher than the above-mentioned position. The inner side surfaces in the width direction of the respective widened parts 43a and 43b are linearly inclined in a direction toward the inner side in the width direction as moving toward the upper side, and, therefore, the respective cross-sectional shapes thereof are formed in wedge shapes (the right-angled triangular shapes). That is, the outer side surfaces in the width direction of the respective widened parts 43a and 43b in a region where the respective widened parts 43a and 43b contact with the outer peripheral surface of the outer column 13a are in contact with the inner side surfaces in the width direction of the support plate parts 31a and 31b. Further, the respective widened parts 43a and 43b are solidly formed in the region where the respective widened parts 43a and 43b come into contact with the outer peripheral surface of the outer column 13a in the up-and-down direction.

Therefore, a gap between the inner side surfaces in the width direction of the widened parts 43a and 43b becomes smaller as moving toward the upper side. In the example illustrated in the drawings, inclination angles $\theta_{43}$ (inclination angles based upon the virtual plane orthogonal to the center axis of the adjustment rod 24a) of the inner side surfaces in the width direction of the respective widened parts 43a and 43b are set to 30°. Further, the inclination angle $\theta_{43}$ can be arbitrarily set, and, for example, the inclination angle $\theta_{43}$ can be set within a range of 1° 043 45°. Further, in the embodiment, the widened parts 43a and 43b are provided at positions where the widened parts 43a and 43b are aligned with the reinforcing ribs 33a and 33b in the up-and-down direction (positions overlapping in the width direction).

Further, in the embodiment, the steering column 6a, that is, the outer column 13a is formed in a polygonal cylindrical shape, and the outer peripheral surface of the outer column 13a is preferably in contact with the pair of column pressing parts 42a and 42b and the pair of widened parts 43a and 43b. In this case, the outer peripheral surface of the outer column 13a has an inclined surface having the same inclination angle as the inclination angles $\theta_{42}$ and $\theta_{43}$ of the inner side surfaces in the width direction of the pair of column pressing parts 42a and 42b and the pair of widened parts 43a and 43b.

However, the polygonal cylindrical shape of the outer column 13a may be formed so that the outer peripheral surface of the outer column 13a comes into surface contact with at least one of the pair of column pressing parts 42a and 42b and the pair of widened parts 43a and 43b, and the polygonal cylindrical shape of the outer column 13a is not limited to a dodecagonal cylindrical shape of the embodiment.

The connection part 41 is positioned at the center in the width direction of the distance bracket 17a, and has a plate thickness thinner than that of the side plate parts 40a and 40b. Additionally, the connection part 41 is formed in an approximately U-shape in cross section, and is provided with a center plate part 44 at the center in the width direction and a pair of inclined continuous parts 45 and 45 which are inclined in a direction toward the lower side as moving toward the outside in the width direction from opposite end edges in the width direction of the center plate part 44. Lower end parts of the inclined continuous parts 45 and 45 are respectively continuous with upper end parts of the widened parts 43a and 43b. Further, a center part in a width direction of a lower surface of the center plate part 44 can be fixed (for example, welded and fixed) to an upper end part of the outer peripheral surface of the outer column 13a. The connection part 41 having such a configuration is elastically deformed, thereby allowing the outer column 13a to be displaced upward.

The clamp mechanism 29 is to switch between a state where a position of the steering wheel 1 can be adjusted and a state where an adjusted position thereof can be held, and is provided with the adjustment rod 24a, an adjustment lever 26a, and a cam device 27a which is an expansion and contraction mechanism.

The adjustment rod 24a is an iron rod-shaped member, and respectively inserts into the long holes for tilt adjustment 23a and 23a and the long holes for telescopic adjustment 21a and 21a in the width direction. Further, a male screw part 46 is formed at a tip part of the adjustment rod 24a, and a head part 47 is provided at the base end part thereof. A nut 48 is screwed to the male screw part 46, and a thrust bearing 49 and a pressing plate 50 are provided in order from the outside in the width direction between the nut 48 and the outer side surface in the width direction of the support plate part 31b on the other side in the width direction. Further, an engaging piece (not illustrated) provided on an inner side surface of the pressing plate 50 is engaged with the long hole for tilt adjustment 23a formed at the support plate part 31b on the other side in the width direction to enable only displacement along the long hole for tilt adjustment 23a (in a state where rotation is prevented).

Further, a base end part of the adjustment lever 26a is engaged and fixed to a portion protruding from the outer side surface in the width direction of the support plate part 31a on one side in the width direction at the base end part of the adjustment rod 24a. The cam device 27a is provided between the adjustment lever 26a and the outer side surface in the width direction of the support plate part 31a on one side in the width direction. The cam device 27a expands and contracts a width direction dimension based upon the relative rotation of a driving side cam 51 and a driven side cam 52, and engages the driven side cam 52 with the long hole for tilt adjustment 23a formed at the support plate part 31a on one side in the width direction to enable only displacement along the long hole for tilt adjustment 23a (in a state where rotation is prevented). On the other hand, the driving side cam 51 is rotatable together with the adjustment rod 24a by the adjustment lever 26a.

The clamp mechanism 29 having the above-mentioned configuration expands and contracts the width direction dimension of the cam device 27a based upon the operation of the adjustment lever 26a, thereby making it possible to expand and contract a gap between an inner side surface in the width direction of the pressing plate 50, which is a pair of pressing parts, and an inner side surface in the width direction of the driven side cam 52.

Next, operation of each part when holding the steering wheel 1 at a position after adjustment will be described in detail.

First, when the adjustment lever 26a is rotated upward (in a locking direction) from the state where the position of the steering wheel 1 can be adjusted, a distance between the driving side cam 51 and the driven side cam 52 is widened, thereby increasing the width direction dimension of the cam device 27a. Accordingly, the distance in the width direction between the inner side surface in the width direction of the driven side cam 52 and the inner side surface in the width direction of the pressing plate 50 is shortened.

The pair of support plate parts 31a and 31b forming the support bracket 18a are elastically deformed toward the inside in the width direction so that respective lower end parts thereof approach each other. Further, at the same time, the pair of side plate parts 40a and 40b forming the distance bracket 17a are pressed against the inside in the width direction by the support plate parts 31a and 31b. Accordingly, the side plate parts 40a and 40b are elastically deformed toward the inside in the width direction so that respective lower end parts thereof approach each other.

When the side plate parts 40a and 40b are elastically deformed as described above, the column pressing parts 42a and 42b are displaced to the inside in the width direction to approach each other. The inner side surfaces in the width direction of the column pressing parts 42a and 42b press (push up) the outer column 13a toward the upper side. That is, as described above, since the inner side surfaces in the width direction of the column pressing parts 42a and 42b are inclined in the direction toward the inner side in the width direction as moving toward the lower side, the displacement of the column pressing parts 42a and 42b toward the inside in the width direction (a force of the inner side in the width direction) can be converted into a force pressing the outer column 13a toward the upper side. Further, the displacement of the outer column 13a toward the upper side is allowed by elastically deforming the center plate part 44 of the connection part 41 in an arch shape so that the upper surface of the center part in the width direction becomes convex. Additionally, in the case of the embodiment, since the outer column 13a is formed in the polygonal cylindrical shape (the decagonal cylindrical shape), sides forming the outer peripheral surface of the outer column 13a and the inner side surfaces in the width direction of the column pressing parts 42a and 42b can come into surface contact with each other.

The widened parts 43a and 43b are pushed and expanded (pressed) toward the outside in the width direction by the outer column 13a which is displaced toward the upper side. That is, as described above, since the inner side surfaces in the width direction of the widened parts 43a and 43b are inclined in the direction toward the inner side in the width direction as moving toward the upper side, the displacement of the outer column 13a toward the upper side (a force directed toward the upper side) can be converted into a force pushing and expanding the widened parts 43a and 43b to the opposite sides in the width direction. Accordingly, the widened parts 43a and 43b are sandwiched between the inner side surfaces in the width direction of the support plate parts 31a and 31b and the outer peripheral surface of the outer column 13a. In the case of the embodiment, since the outer column 13a is formed in the polygonal cylindrical shape (the dodecagonal shape), the sides forming the outer peripheral surface of the outer column 13a and the inner side surfaces in the width direction of the widened parts 43a and 43b can respectively come into surface contact with each other (a pressing force is applied in a range indicated by p in FIG. 4).

Further, in this state, in the outer column 13a, a pressing force acts on two positions spaced apart from each other in a circumferential direction of an upper half part from the widened parts 43a and 43b, and a pressing force acts on two positions spaced apart from each other in a circumferential direction of a lower half part from the column pressing parts 42a and 42b. Accordingly, the inner diameter of the outer column 13a is shortened, thereby holding the outer peripheral surface of the inner column 14a by the inner peripheral surface of the outer column 13a.

In the embodiment, as described above, the steering wheel 1 is held at the position after the adjustment.

On the other hand, when adjusting the position of the steering wheel 1, the adjustment lever 26a is rotated downward (a unlock direction) from a state where the position of the steering wheel 1 is held. Then, the width direction dimension of the cam device 27a is reduced, and a distance in the width direction between the inner side surface in the width direction of the pressing plate 50 and the inner side surface in the width direction of the driven side cam 52 is expanded. Accordingly, the support plate parts 31a and 31b and the side plate parts 40a and 40b return to a free state from an elastically deformed state.

Further, when the column pressing parts 43a and 43b are respectively displaced toward the outside in the width direction in accordance with the elastic return of the side plate parts 40a and 40b, a force in which the column pressing parts 43a and 43b press the outer column 13a toward the upper side is released, and, therefore, the outer column 13a is displaced toward the lower side (retracted). Thus, a force acting to push and expand the widened parts 43a and 43b to the outside in the width direction is also released. Accordingly, the widened parts 43a and 43b are not firmly sandwiched between the outer peripheral surface of the outer column 13a and the inner side surfaces in the width direction of the support plate parts 31a and 31b. Further, the pressing force (the holding force) acting on the outer column 13a from the widened parts 43a and 43b and the column pressing parts 42a and 42b is also lost. As a result, the steering wheel 1 becomes a state in which a position thereof can be adjusted in the front-and-rear direction and the up-and-down direction.

According to the steering device of the embodiment having the above-mentioned configuration, it is possible to achieve both improvement of the holding force of the distance bracket 17a by the support bracket 18a and improvement of support rigidity of the steering column 6a in the width direction.

That is, when the steering wheel 1 is held at the position after the adjustment, the gap between the inner side surfaces in the width direction of the widened parts 43a and 43b which are sandwiched between the inner side surfaces in the width direction of the support plate parts 31a and 31b and the outer peripheral surface of the outer column 13a becomes smaller as moving toward a displacement direction (the upper side) of the outer column 13a. Therefore, the widened parts 43a and 43b can be firmly sandwiched between the inner side surfaces in the width direction of the support plate parts 31a and 31b and the outer peripheral surface of the outer column 13a by wedge effect. Further, in the case of the embodiment, since the widened parts 43a and 43b are pressed against portions near upper ends of the support plate parts 31a and 31b in which rigidity is high in the width direction because of connection part sides with the mounting plate part 30a and 30b, and further, the reinforcing ribs 33a and 33b are provided on the outside in the width direction of the corresponding portions (the portions near the upper ends against which the widened parts 43a and 43b are pressed), the support plate parts 31a and 31b can be effectively prevented from being elastically deformed to the outside in the width direction based upon the pressing force of the widened parts 43a and 43b. Therefore, it is possible to sufficiently increase surface pressure between opposite side surfaces in the width direction of the widened parts 43a and 43b; and the inner side surfaces in the width direction of the support plate parts 31a and 31b and the outer peripheral surface of the outer column 13a. Therefore, according to the embodiment, the holding force of the distance bracket 17a by the support bracket 18a can be improved.

Additionally, in the case of the embodiment, the reinforcing ribs 33a and 33b (the solid parts 39 and 39) are respectively provided to be bridged between the lower surfaces of the mounting plate parts 30a and 30b and the outer side surfaces in the width direction of the support plate parts 31a and 31b. Therefore, with respect to the support plate parts 31a and 31b, the rigidity in the width direction can be improved, respectively. Thus, according to the embodiment, the improvement of the support rigidity of the steering column 6a in the width direction can be achieved.

As described above, according to the steering device of the embodiment, it is possible to achieve both the improvement of the holding force of the distance bracket 17a by the support bracket 18a and the improvement of the support rigidity of the steering column 6a in the width direction.

Second Embodiment

Figure 5:
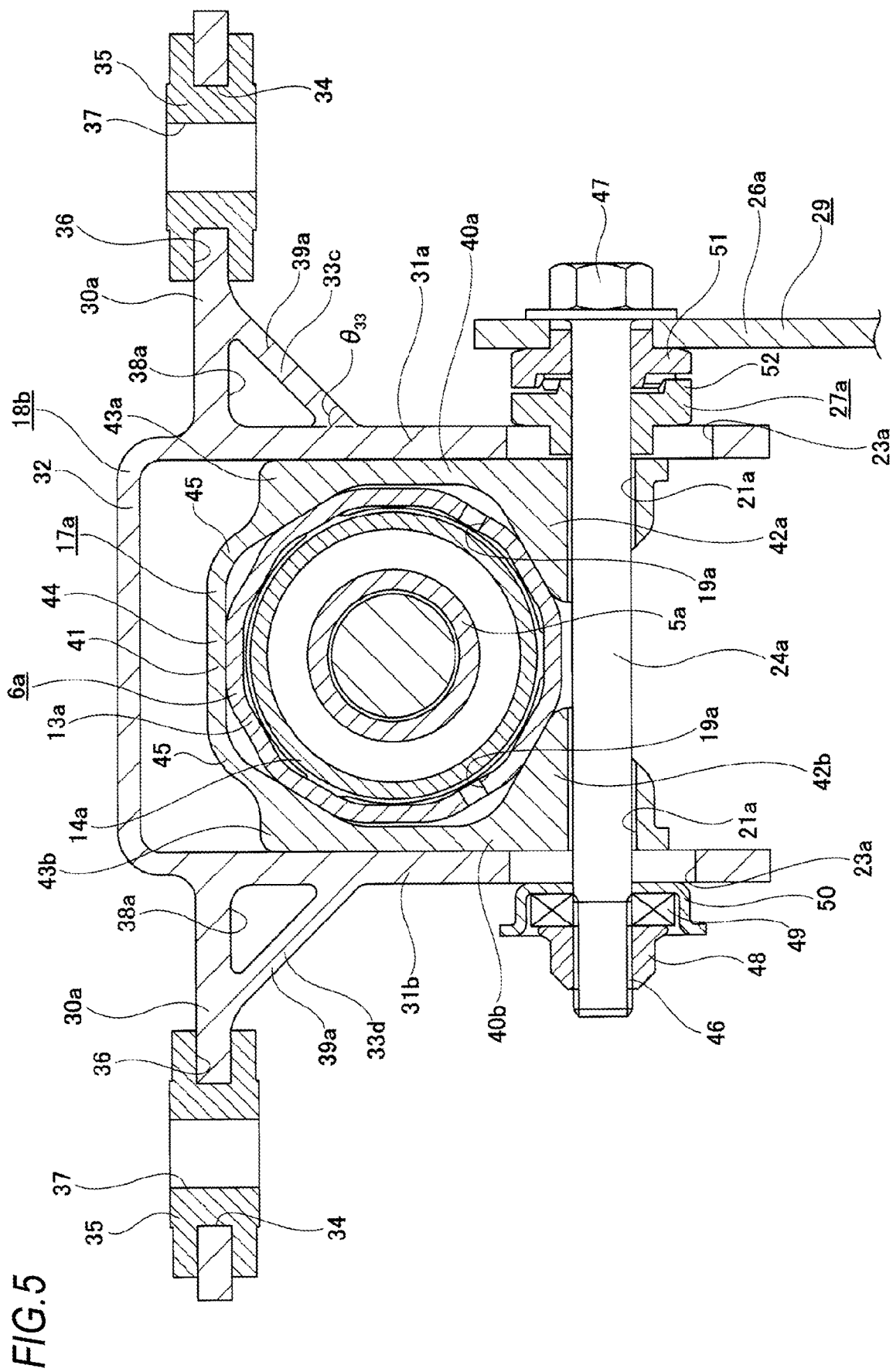
FIG. 5 is a diagram illustrating a second embodiment of the present invention corresponding to FIG. 4.

A second embodiment of the present invention will be described with reference to FIG. 5. In a steering device of the second embodiment, only a structure of a support bracket 18b is different from the structure of the above-mentioned first embodiment.

In the case of the support bracket 18b of the present embodiment, shapes (sectional shapes) of the pair of reinforcing ribs 33c and 33d are different from those of the first embodiment. That is, in the embodiment, the reinforcing ribs 33c and 33d have a larger ratio of a width direction dimension with respect to an up-and-down direction dimension in comparison with that in the first embodiment, and cross sectional shapes formed by the mounting plate parts 30a and 30b, the support plate parts 31a and 31b, and the reinforcing ribs 33c and 33d are right-angled isosceles triangular shapes. Therefore, the inclination angles $\theta_{33}$ of solid parts 39a and 39a forming the respective reinforcing ribs 33c and 33d (inclination angles with respect to the outer side surfaces in the width direction of the support plate parts 31a and 31b) are larger in comparison with those of the first embodiment (in the illustrated drawings, the inclination angles $\theta_{33}$ is set to 45°). Further, volumes of spaces 38a and 38a opened on both front and rear sides of the reinforcing ribs 33c and 33d are larger in comparison with those of the first embodiment.

In the case of the embodiment having the above-mentioned configuration, rigidity of the pair of mounting plate parts 30a and 30b in the up-and-down direction can be improved.

Other configurations and operational effects are the same as those of the first embodiment.

Third Embodiment

Figure 6:
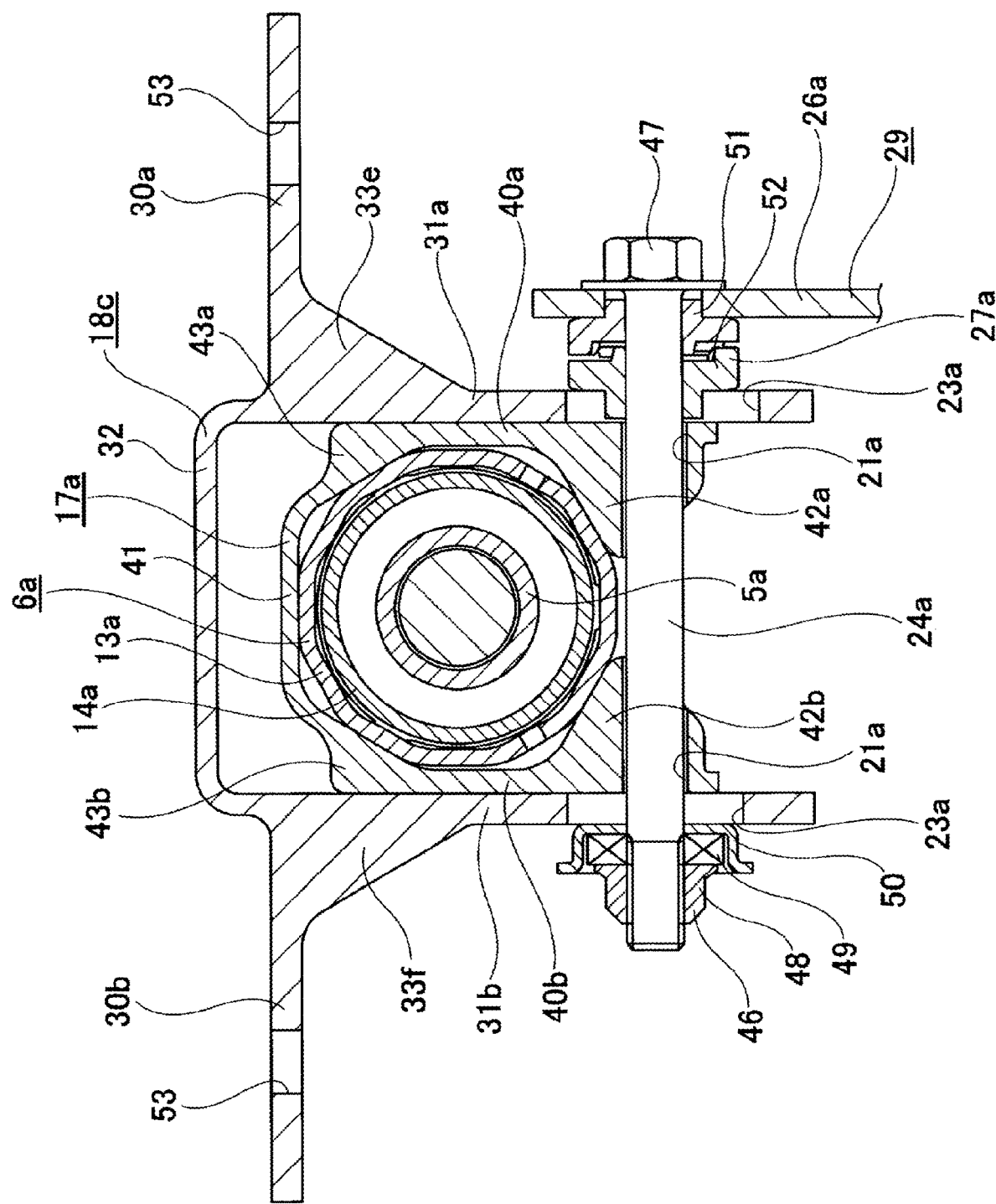
FIG. 6 is a diagram illustrating a third embodiment of the present invention corresponding to FIG. 4.

A third embodiment of the present invention will be described with reference to FIG. 6. In a steering device of the third embodiment, only a structure of a support bracket 18c is different from the structure of the above-mentioned first embodiment.

The support bracket 18c is integrally formed by performing the extrusion molding (or the pultrusion molding) on a light alloy material such as an aluminum alloy, and the like, and solid reinforcing ribs 33e and 33f are provided (at corner angle parts) between the lower surfaces of the pair of mounting plate parts 30a and 30b and the outer side surfaces in the width direction of the pair of support plate parts 31a and 31b. The reinforcing ribs 33e and 33f are formed in right-angled triangular prism shapes (right-angled triangular shapes in cross section). Further, in the case of the embodiment, in order to support and fix the support bracket 18c having such a configuration to the vehicle body 11 (refer to FIG. 13) so as not to be detached therefrom, mounting holes 53 and 53 are formed at the mounting plate parts 30a and 30b instead of the notches.

In the case of the embodiment having the configuration as described above, it is possible to further improve the rigidity of the support plate parts 31a and 31b in the width direction in comparison with that of the first embodiment.

Other configurations and operational effects are the same as those of the first embodiment.

Fourth Embodiment

Figure 7:
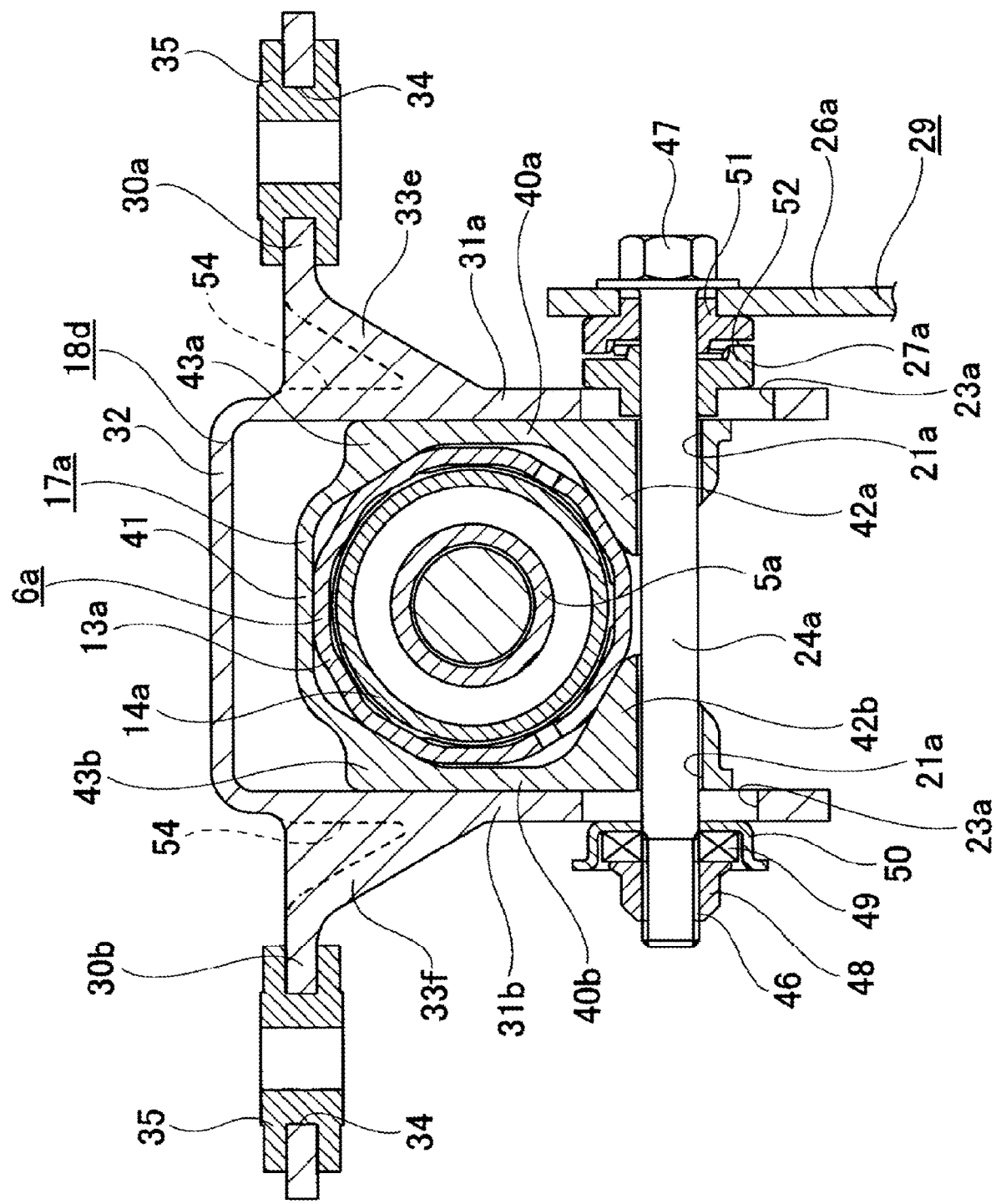
FIG. 7 is a diagram illustrating a fourth embodiment of the present invention corresponding to FIG. 4.

A fourth embodiment of the present invention will be described with reference to FIG. 7. In a steering device of the fourth embodiment, only a structure of a support bracket 18d is different from the structure of the above-mentioned third embodiment.

The support bracket 18d is integrally formed by the die-cast molding of a light alloy such as an aluminum alloy, and the like, and the reinforcing ribs 33e and 33f are provided (at corner angle parts) between the lower surfaces of the pair of mounting plate parts 30a and 30b and the outer side surfaces in the width direction of the pair of support plate parts 31a and 31b. The reinforcing ribs 33e and 33f are formed in the right-angled triangular prism shapes (the right-angled triangular shape in cross section) when viewed from the axial direction. Particularly, in the case of the present embodiment, a plurality of thickness reduced parts 54 and 54 are formed inside the reinforcing ribs 33e and 33f in a state of being opened on the upper surfaces of the inner end parts in the width direction of the mounting plate parts 30a and 30b. The plurality of thickness reduced parts 54 and 54 are formed inside the respective reinforcing ribs 33e and 33f in a state of being spaced apart from each other in the front-and-rear direction. Further, in an example illustrated in the drawing, each of the thickness reduced parts 54 and 54 is formed in a triangular prism shape (the right-angled triangular prism shape).

In the case of the embodiment having the configuration as described above, it is possible to reduce a weight of the support bracket 18d in comparison with the structure of the third embodiment which does not include the respective thickness reduced parts 54 and 54.

Other configurations and operational effects are the same as those of the first and third embodiments.

Fifth Embodiment

Figure 8:
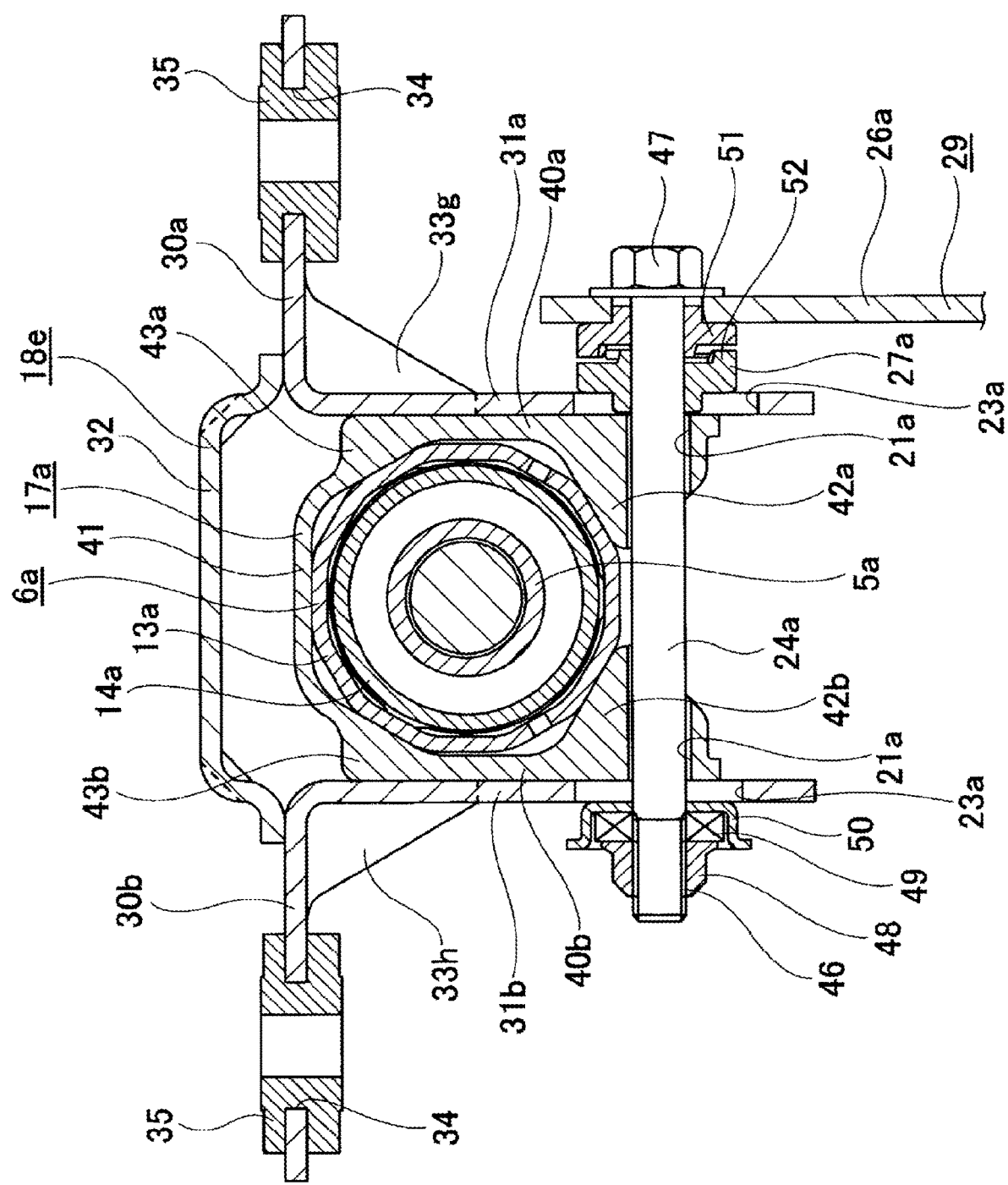
FIG. 8 is a diagram illustrating a fifth embodiment of the present invention corresponding to FIG. 4.

A fifth embodiment of the present invention will be described with reference to FIG. 8. In a steering device of the fifth embodiment, only a structure of a support bracket 18*e* is different from the structure of the above-mentioned first embodiment.

The support bracket 18*e* is formed by performing a press process such as a punching process, a bending process, and the like on a metal plate such as a stainless steel plate, and the like, and even for a pair of reinforcing ribs 33*g* and 33*h*, the process is performed simultaneously with the support bracket 18*e*. The reinforcing ribs 33*g* and 33*h* are formed in such a manner that flat plate-shaped pieces having an approximately right-angled triangular shapes, all of which are provided in a state of respectively protruding rearward, are bent at a right angle toward the lower side at rear end edge parts of portions near inner ends in the width direction of the pair of mounting plate parts 30*a* and 30*b*, and are fixed to rear end edge parts of the pair of support plate parts 31*a* and 31*b* by welding, and the like. Accordingly, in the case of the embodiment, the reinforcing ribs 33*g* and 33*h* are formed in flat plate shapes and are provided only at the rear end part of the support bracket 18*e*.

In the case of the embodiment having the configuration as described above, the rigidity of the support plate parts 31*a* and 31*b* in the width direction can be improved by using the inexpensive support bracket 18*e* produced by performing the press process on the steel plate as an object.

Other configurations and operational effects are the same as those of the first embodiment.

Sixth Embodiment

Figure 9:
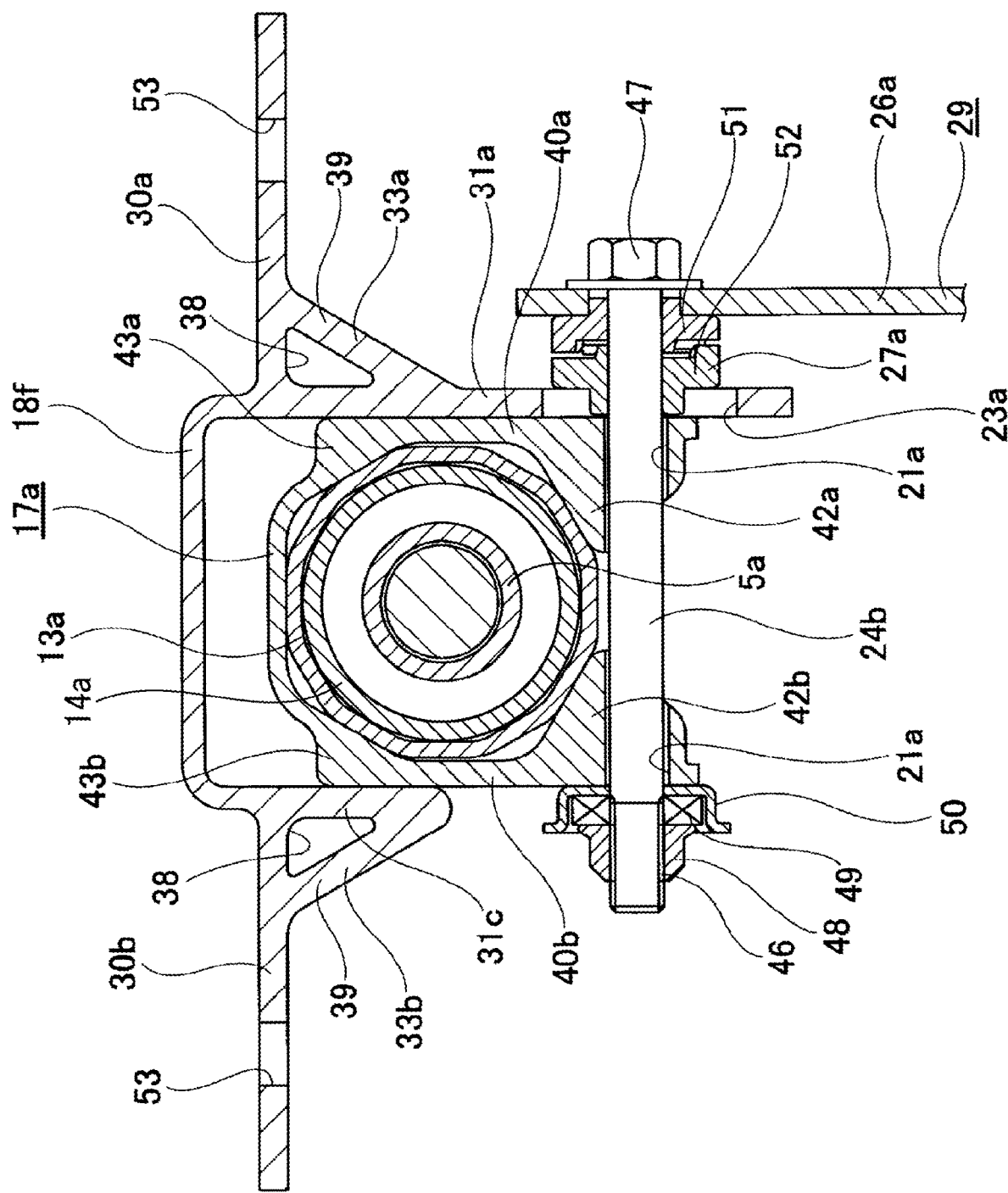
FIG. 9 is a diagram illustrating a sixth embodiment of the present invention corresponding to FIG. 4.

A sixth embodiment of the present invention will be described with reference to FIG. 9. In a steering device of the sixth embodiment, a structure of a support bracket 18*f* and peripheral structures thereof are different from the structures of the above-mentioned first embodiment.

In the case of the support bracket 18*f*, a vertical dimension of a support plate part 31*c* disposed on the other side in the width direction out of the pair of support plate parts 31*a* and 31*c* is smaller than a vertical dimension of a support plate part 31*a* disposed on one side in the width direction. Therefore, a lower end part of the support plate part 31*c* on the other side in the width direction is positioned higher than a lower end part of the support plate part 31*a* on one side in the width direction. More specifically, in the case of the embodiment, a position of the lower end part of the support plate part 31*c* on the other side in the width direction coincides with a position of a lower end part of the reinforcing rib 33*b* (a solid part 39). Therefore, the long hole for tilt adjustment 23*a* provided on the support plate part 31*a* on one side in the width direction is not provided on the support plate part 31*c* on the other side in the width direction.

Therefore, in the case of the embodiment, an adjustment rod which is shorter than the adjustment rod used in the first embodiment is used as the adjustment rod 24*b*, and the inner side surface in the width direction of the pressing plate 50 provided around the adjustment rod 24*b* is directly abutted on the outer side surface in the width direction of the side plate part 40*b* on the other side in the width direction forming the distance bracket 17*a*.

In the case of the embodiment having the configuration as described above, the support plate part 31*c* on the other side in the width direction is not pressed against the inside in the width direction by the pressing plate 50. However, since the pair of widened parts 43*a* and 43*b* forming the distance bracket 17*a* are strongly pressed against the inner side surfaces in the width direction of the support plate parts 31*a* and 31*c*, the distance bracket 17*a* can be held with a sufficiently large force by the support bracket 18*f*. Further, in the case of the embodiment, since a key lock unit, which is not illustrated, provided around the rear end side of the outer column 13*a* can be moved toward a vehicle front side more than the support bracket 18*f* at the time of the secondary collision, and the like, it is possible to secure a large contraction stroke of the steering column 6*a*, thereby improving protection of a driver.

Other configurations and operational effects are the same as those of the first embodiment.

Seventh Embodiment

Figure 10:
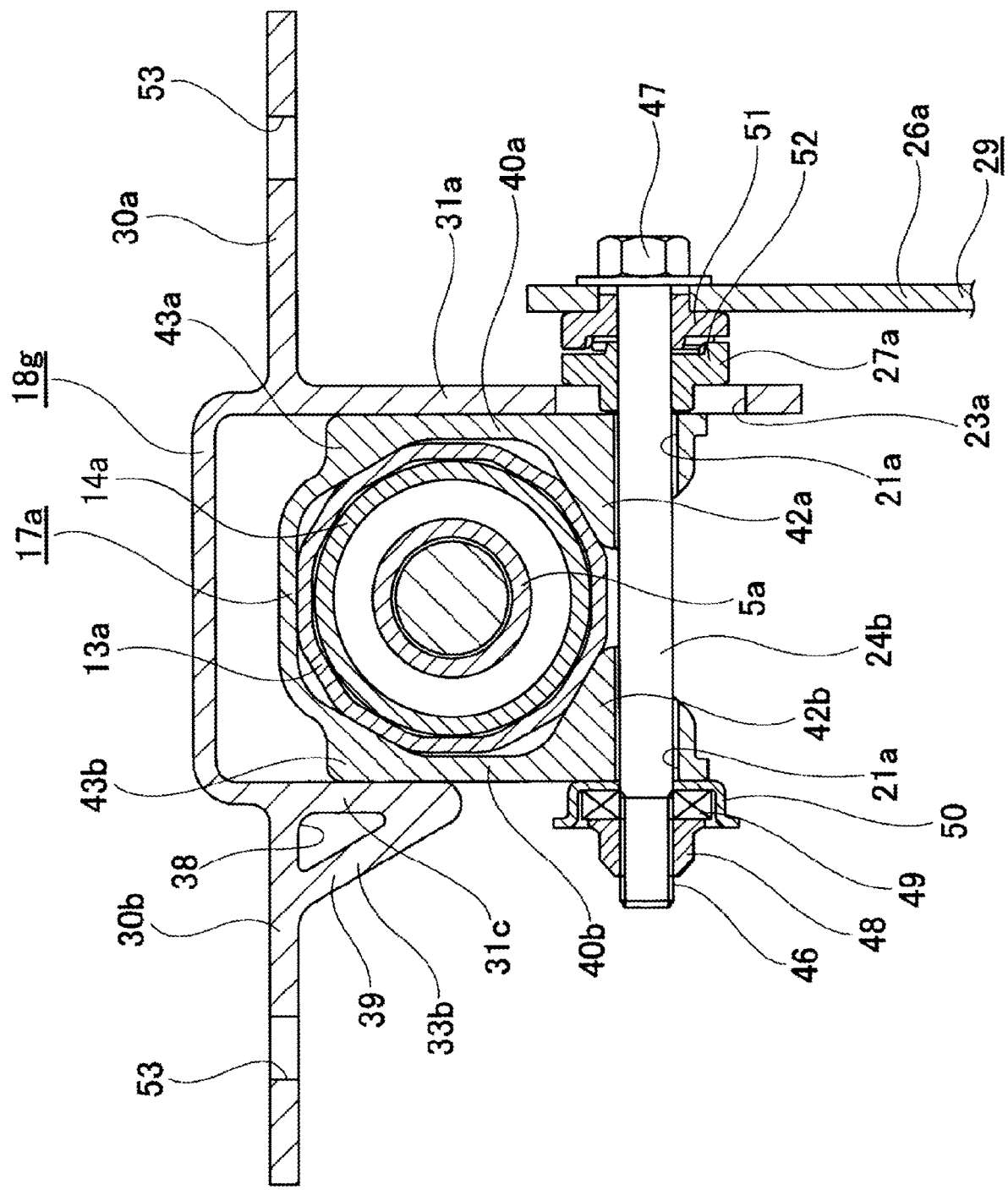
FIG. 10 is a diagram illustrating a seventh embodiment of the present invention corresponding to FIG. 4.

A seventh embodiment of the present invention will be described with reference to FIG. 10. In a steering device of the seventh embodiment, only a structure of a support bracket 18*g* is different from the structure of the above-mentioned sixth embodiment.

In the case of the support bracket 18*g* of the embodiment, the reinforcing rib is omitted from between the lower surface of the mounting plate part 30*a* disposed on one side in the width direction and the outer side surface in the width direction of the support plate part 31*a* disposed on one side in the width direction. The reinforcing rib 33*b* is provided between the lower surface of the mounting plate part 30*b* disposed on the other side in the width direction and the outer side surface in the width direction of the support plate part 31*c* disposed on the other side in the width direction in the same manner as that of the fifth embodiment.

In the case of the embodiment having the configuration described above, the support plate part 31*a* on one side in the width direction is easily deflected in the width direction in comparison with the structure of the sixth embodiment, however, since the support plate part 31*a* is pressed against the inside in the width direction by the driven side cam 52, surface pressure of an abutting part can be sufficiently increased even when the pair of widened parts 43*a* and 43*b* are pushed and expanded toward the outside in the width direction. Further, in the case of the embodiment, the weight of the support bracket 18*g* can be reduced.

Other configurations and operational effects are the same as those of the first embodiment.

Eighth Embodiment

Figure 11:
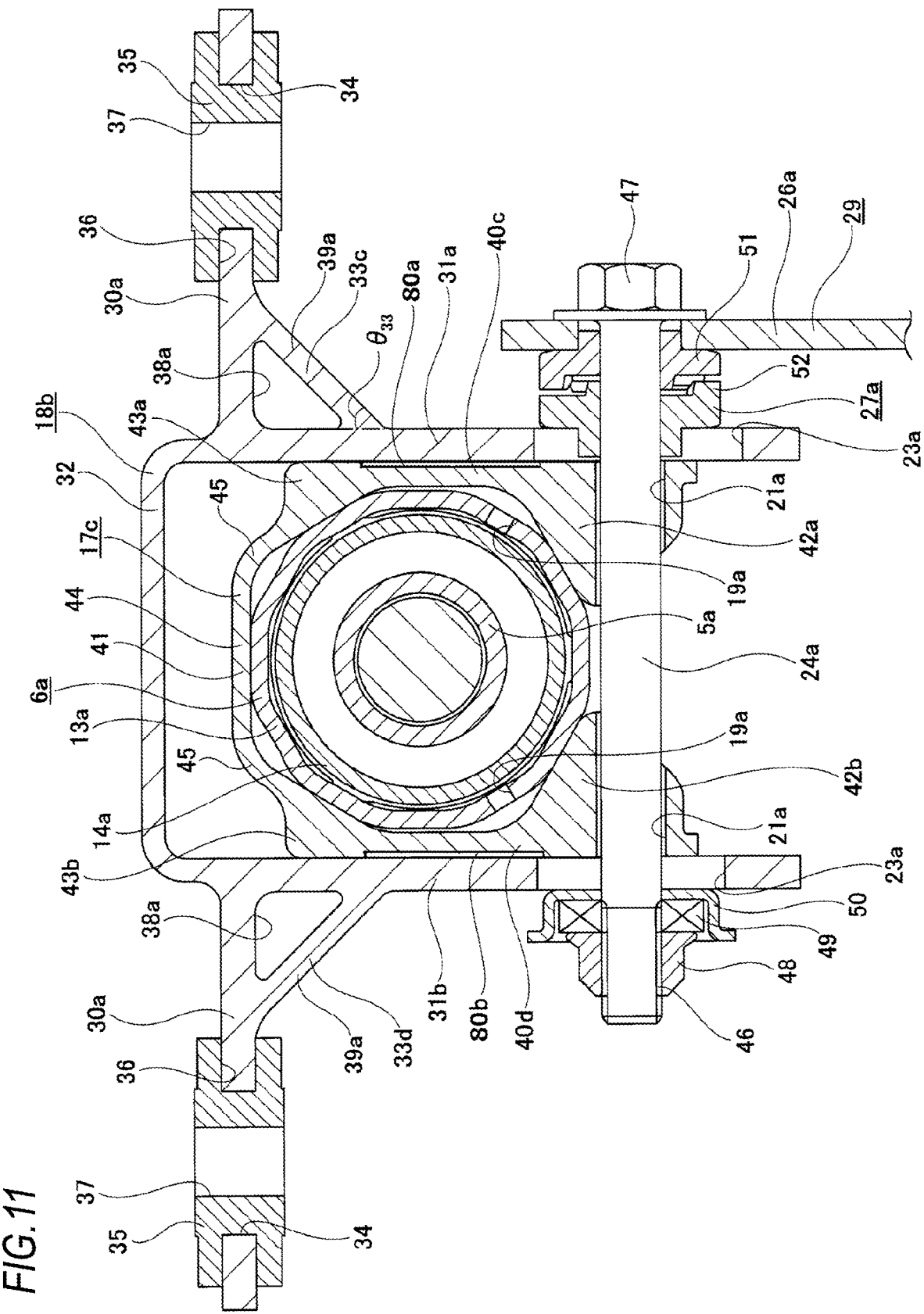
FIG. 11 is a diagram illustrating an eighth embodiment of the present invention corresponding to FIG. 4.

An eighth embodiment of the present invention will be described with reference to FIG. 11. In the first to fifth embodiments, the inner side surface of the support plate part 31*a* and the outer side surfaces of the widened part 43*a*, the side plate part 40*a*, and the column pressing part 42*a*; and further, the inner side surface of the support plate part 31*b* and the outer side surfaces of the widened part 43*b*, the side plate part 40*b*, and the column pressing part 42*b* fully contact with each other. On the other hand, in the embodiment, recessed parts 80*a* and 80*b* are respectively provided on the outer side surfaces of the side plate parts 40*c* and 40*d* in FIG. 11, and the outer side surface of the widened part 43*a* and the inner side surface of the support plate part 31*a*, and further, the outer side surface of the widened part 43*b* and the inner side surface of the support plate part 31*b* are brought into contact with each other. Further, the outer side surface of the column pressing part 42*a* and the inner side surface of the support plate part 31*a*; and further, the outer side surface of the column pressing part 42*b* and the inner side surface of the support plate part 31*b* contact with each other. According to the configuration, it is possible to apply a clamp force by the adjustment lever 26*a* concentrically to a contact portion between the inner side surface of the widened part 43a and the outer side surface of the outer column 13a, a contact portion between the inner surface of the widened part 43b and the outer surface of the outer column 13a, a contact portion between the column pressing part 42a and the outer surface of the outer column 13a, and a contact portion between the column pressing part 42b and the outer surface of the outer column 13a. Accordingly, it is possible not only to achieve further improvement of the holding force of the distance bracket 17c by the support bracket 18b, but also to achieve further improvement of the support rigidity of the steering column 6a in the width direction.

Other configurations and operational effects are the same as those of the first embodiment.

Ninth Embodiment

A ninth embodiment of the present invention will be described with reference to FIGS. 12A and 12B. In the first to eighth embodiments, as the steering column 6a, a rear part of the inner column 14a on the front side is internally fitted to a front part of the outer column 13a on the rear side to be able to be relatively displaced in the axial direction as illustrated in FIG. 12B, thereby adopting a telescopic shape capable of expanding and contracting the whole length.

Figure 12A:
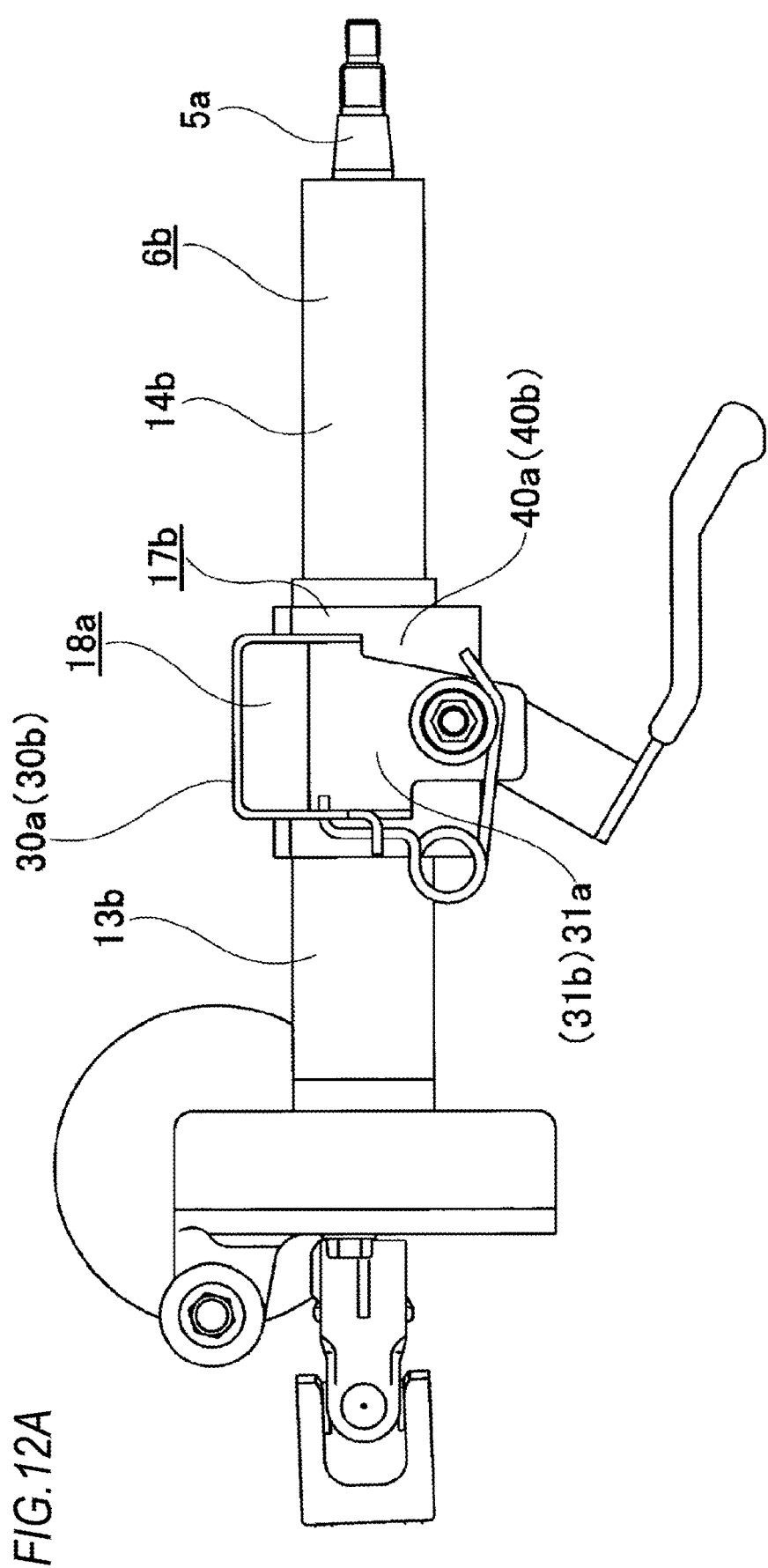
FIG. 12A is a side diagram illustrating a structure of a steering device according to a ninth embodiment of the present invention.
Figure 12B:
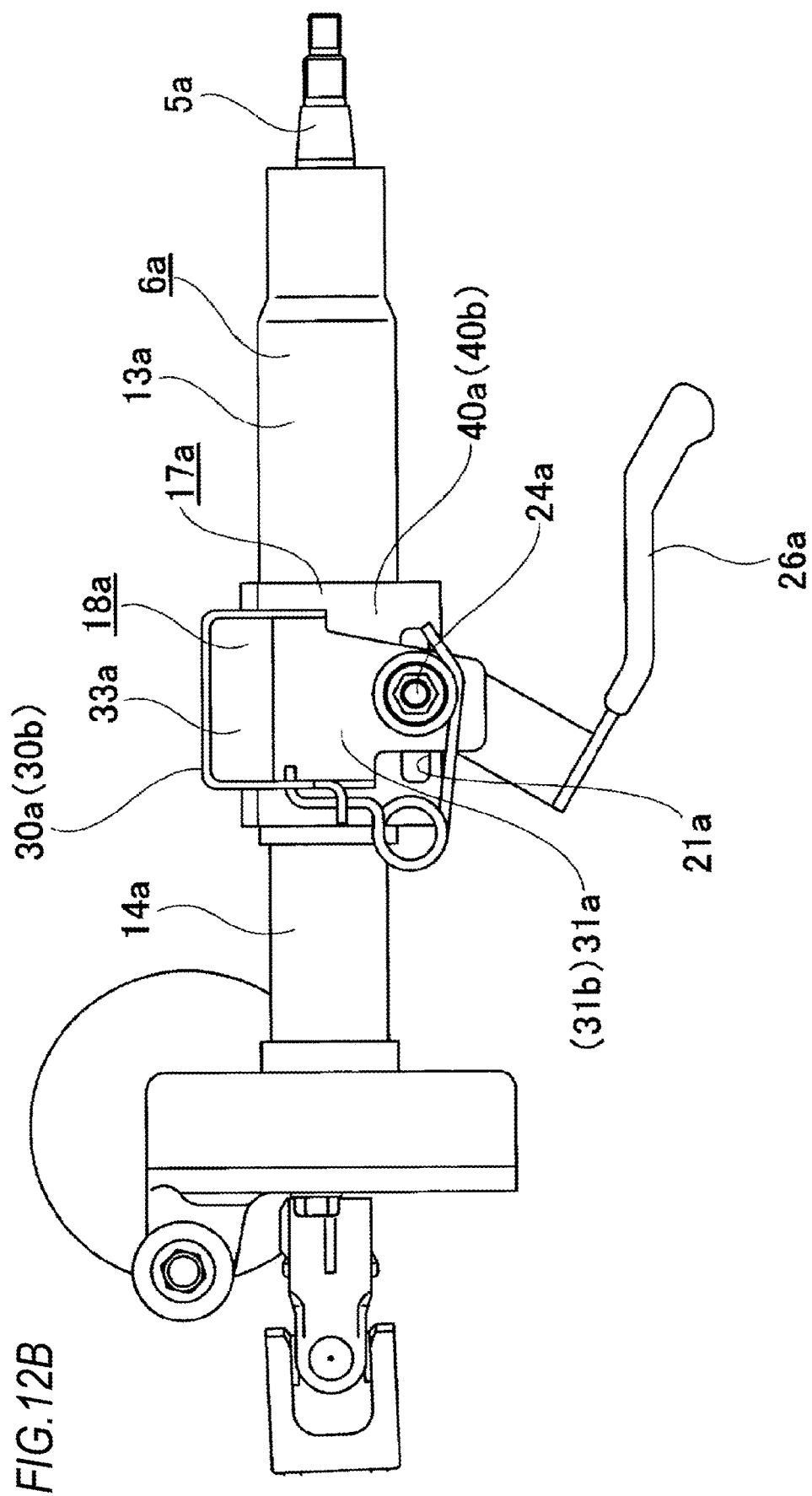
FIG. 12B is a side diagram illustrating a structure of a steering device according to the first to eighth embodiments of the present invention.

On the other hand, in the case of the steering device of the embodiment, as a steering column 6b, a rear part of an outer column 13b on the front side is externally fitted to a front part of an inner column 14b on the rear side to be able to be relatively displaced in the axial direction as illustrated in FIG. 12A, thereby adopting the telescopic shape capable of expanding and contracting the whole length. In the case of the embodiment as described above, a simple circular hole (not illustrated) is formed at the pair of side plate parts 40a and 40b forming the distance bracket 17b instead of the long holes for telescopic adjustment 21a and 21a.

Other configurations and operational effects are the same as those of the first embodiment.

INDUSTRIAL APPLICABILITY

The present invention is applicable to a steering device of a structure including only a telescopic mechanism capable of adjusting a longitudinal position of a steering wheel; a structure including only a tilt mechanism capable of adjusting a vertical position of a steering wheel; and a structure including the telescopic mechanism and the tilt mechanism.

Further, when the present invention is performed, a structure which is vertically symmetrical with the structures of respective embodiments described above can be adopted as the distance bracket. In the case of adopting the configurations described above, with respect to the distance bracket, descriptions of the up-and-down direction become opposite to cases of the respective embodiment described above. Further, when the present invention is implemented, the structures of the respective embodiments described above can be appropriately combined with each other to be implemented.

This application is based upon JP-A-2016-141068 filed on Jul. 19, 2016 and JP-A-2017-109203 filed on Jun. 1, 2017, and the entire contents of which are incorporated herein by reference.

DESCRIPTION OF REFERENCE NUMERALS AND SIGNS

1: steering wheel
2: steering gear unit
3: input shaft
4: tie rod
5, 5a: steering shaft
6, 6a, 6b: steering column
7: universal joint
8: intermediate shaft
9: universal joint
10: electric motor
11: vehicle body
12: pivot
13, 13a, 13b: outer column
14, 14a, 14b: inner column
15, 15a: outer shaft (outer tube)
16: inner shaft
17, 17a, 17b, 17c: distance bracket
18, 18a to 18g: support bracket
19, 19a: slit
20a, 20b: side plate part
21, 21a: long hole for telescopic adjustment
22a, 22b: support plate part
23, 23a: long hole for tilt adjustment
24, 24a, 24b: adjustment rod
25: nut
26, 26a: adjustment lever
27, 27a: cam device
28: eccentric cam
29: clamp mechanism
30a, 30b: mounting plate part
31a, 31b, 31c: support plate part
32: bridge part
33a to 33h: reinforcing rib
34: notch
35: capsule
36: locking groove
37: through hole
38, 38a: space
39, 39a: solid part
40a, 40b, 40c, 40d: side plate part
41: connection part
42a, 42b: column pressing part
43a, 43b: widened part
44: center plate part
45: inclined continuous part
46: male screw part
47: head part
48: nut
49: thrust bearing
50: pressing plate
51: driving side cam
52: driven side cam
53: mounting hole
54: thickness reduced part
80a, 80b: recessed part

The invention claimed is:

1. A steering device, comprising:
a steering column with a cylindrical shape which rotatably supports a steering shaft at the inside;
a support bracket including a pair of mounting plate parts which are supported and fixed to a vehicle body, and a pair of support plate parts respectively hanging downward from inner end parts in a width direction of the pair of the mounting plate parts;
a distance bracket including a pair of side plate parts which are disposed between inner side surfaces in the width direction of the pair of support plate parts and an outer peripheral surface of the steering column; and an adjustment rod provided in a state of respectively inserting into a first through hole which is provided in at least one of the pair of support plate parts, and a pair of second through holes which are provided at the pair of side plate parts in the width direction, wherein:

a column pressing part which presses the steering column in a direction of separating from the adjustment rod in an up-and-down direction is provided;

the pair of side plate parts are provided with a pair of widened parts which are disposed on the side opposite to the adjustment rod with a center axis of the steering column sandwiched therebetween in the up-and-down direction, and have a gap between inner side surfaces thereof in the width direction becoming smaller as separating from the adjustment rod;

a reinforcing rib is provided between at least one mounting plate part of the pair of mounting plate parts and the support plate part hanging downward from the inner end part in the width direction of the mounting plate part;

the pair of widened parts and the reinforcing rib are provided at positions aligned with each other in the up-and-down direction; and the steering column is formed in a polygonal cylindrical shape so that the outer peripheral surface of the steering column comes into surface contact with at least one of the pair of column pressing parts and the pair of widened parts;

the widened parts are pushed and expanded toward an outside in the width direction by the steering column which is displaced in the direction of separating from the adjustment rod; and when $\theta 43$ denotes inclination angles of the inner side surfaces in the width direction of the respective widened parts based upon a virtual plane orthogonal to a center axis of the adjustment rod and $\theta 42$ denotes inclination angles of inner side surfaces in the width direction of the respective column pressing parts based upon the virtual plane orthogonal to the center axis of the adjustment rod, $\theta 43$ and $\theta 42$ are given by $\theta 43 < \theta 42$.

2. The steering device according to claim 1, wherein the reinforcing rib is formed in a hollow structure which is opened on opposite sides in a front-and-rear direction.

3. The steering device according to claim 1, wherein the reinforcing rib is formed over an axial direction at least at a right upper part of the second through hole when viewed in the front-and-rear direction.

4. The steering device according to claim 1, wherein the support plate part on one side hangs downward lower than the support plate part on the other side, and the first through hole is provided only at the support plate part on one side.

5. The steering device according to claim 1, wherein:
inner side surfaces of the pair of widened parts in the width direction contact an outer peripheral surface of the steering column; and outer side surfaces of the pair of widened parts in the width direction contact the support plate part in a region where the pair of the widened parts contact the outer peripheral surface of the steering column in the up-and-down direction, and the pair of widened parts are solidly formed.

6. The steering device according to claim 1, wherein:
the distance bracket further includes a connection part for connecting the pair of side plate parts; and
the pair of side plate parts and the connection part are integrally formed.

7. A steering device, comprising:
a steering column with a cylindrical shape which rotatably supports a steering shaft at the inside;
a support bracket including a pair of mounting plate parts which are supported and fixed to a vehicle body, and a pair of support plate parts respectively hanging downward from inner end parts in a width direction of the pair of the mounting plate parts;
a distance bracket including a pair of side plate parts which are disposed between inner side surfaces in the width direction of the pair of support plate parts and an outer peripheral surface of the steering column; and
an adjustment rod provided in a state of respectively inserting into a first through hole which is provided in at least one of the pair of support plate parts, and a pair of second through holes which are provided at the pair of side plate parts in the width direction, wherein:

a column pressing part which presses the steering column in a direction of separating from the adjustment rod in an up-and-down direction is provided;

the pair of side plate parts are provided with a pair of widened parts which are disposed on the side opposite to the adjustment rod with a center axis of the steering column sandwiched therebetween in the up-and-down direction, and have a gap between inner side surfaces thereof in the width direction becoming smaller as separating from the adjustment rod;

a reinforcing rib is provided between at least one mounting plate part of the pair of mounting plate parts and the support plate part hanging downward from the inner end part in the width direction of the mounting plate part;

the pair of widened parts and the reinforcing rib are provided at positions aligned with each other in the up-and-down direction;

the steering column is formed in a polygonal cylindrical shape so that the outer peripheral surface of the steering column comes into surface contact with at least one of the pair of column pressing parts and the pair of widened parts; and the support plate part on one side hangs downward lower than the support plate part on the other side, and the first through hole is provided only at the support plate part on one side.

* * * * *